(12) United States Patent  (10) Patent No.: US 6,695,549 B2
Hecht  (45) Date of Patent: Feb. 24, 2004

(54) CUTTING TOOL ASSEMBLY

(75) Inventor: Gil Hecht, Nahariya (IL)

(73) Assignee: Iscar Ltd., Tefen (IL)

( * ) Notice: Subject to any disclaimer, the term of this patent is extended or adjusted under 35 U.S.C. 154(b) by 57 days.

(21) Appl. No.: 10/038,888

(22) Filed: Jan. 8, 2002

(65) Prior Publication Data
US 2002/0057950 A1 May 16, 2002

Related U.S. Application Data

(63) Continuation-in-part of application No. PCT/IL00/00452, filed on Jul. 30, 2000.

(30) Foreign Application Priority Data
Aug. 5, 1999 (IL) .................................................. 131260

(51) Int. Cl.[7] .............................. B26D 1/12; B26D 1/00; B23P 15/28
(52) U.S. Cl. ............................ 407/40; 407/110; 407/72
(58) Field of Search .............................. 407/30, 72, 33, 407/35, 42, 43, 50, 70, 91, 110

(56) References Cited

U.S. PATENT DOCUMENTS

| 3,785,021 A | | 1/1974 | Norgren | 29/96 |
|---|---|---|---|---|
| 4,443,136 A | * | 4/1984 | Kemmer | 407/72 |
| 5,076,738 A | | 12/1991 | Pano et al. | 407/110 |
| 5,360,298 A | | 11/1994 | Hedlund | 407/110 |
| 5,607,263 A | * | 3/1997 | Nespeta et al. | 407/61 |
| 5,833,403 A | | 11/1998 | Barazani | 407/101 |
| 5,836,724 A | * | 11/1998 | Satran et al. | 407/104 |
| 6,053,672 A | * | 4/2000 | Satran et al. | 407/40 |
| 6,109,152 A | * | 8/2000 | Hecht | 82/160 |
| 6,293,737 B1 | * | 9/2001 | Satran et al. | 407/113 |
| 6,536,996 B2 | * | 3/2003 | Satran et al. | 407/34 |
| 2002/0081165 A1 | * | 6/2002 | Hecht | 407/110 |

OTHER PUBLICATIONS

International Search Report in PCT/IL00/00452 dated Nov. 28, 2000.
Written Opinion in PCT/IL00/00452 dated Sept. 6, 2001.
Response to Written Opinion in PCT/IL00/00452 dated Oct. 31, 2001.
International Preliminary Examination Report in PCT/IL00/00452 dated Dec. 7, 2001.

* cited by examiner

Primary Examiner—A. L. Wellington
Assistant Examiner—Brian D. Walsh
(74) Attorney, Agent, or Firm—Womble Carlyle

(57) ABSTRACT

A cutting tool assembly having a cutting insert with a generally cylindrical portion and an axially extending radial projection. The cutting insert is located in an insert retaining portion with the axially extending radial projection protruding from an axially extending aperture. The cutting insert is clamped in position by means of a resilient radial force exerted by a resilient clamping jaw on the generally cylindrical portion of the cutting insert.

45 Claims, 20 Drawing Sheets

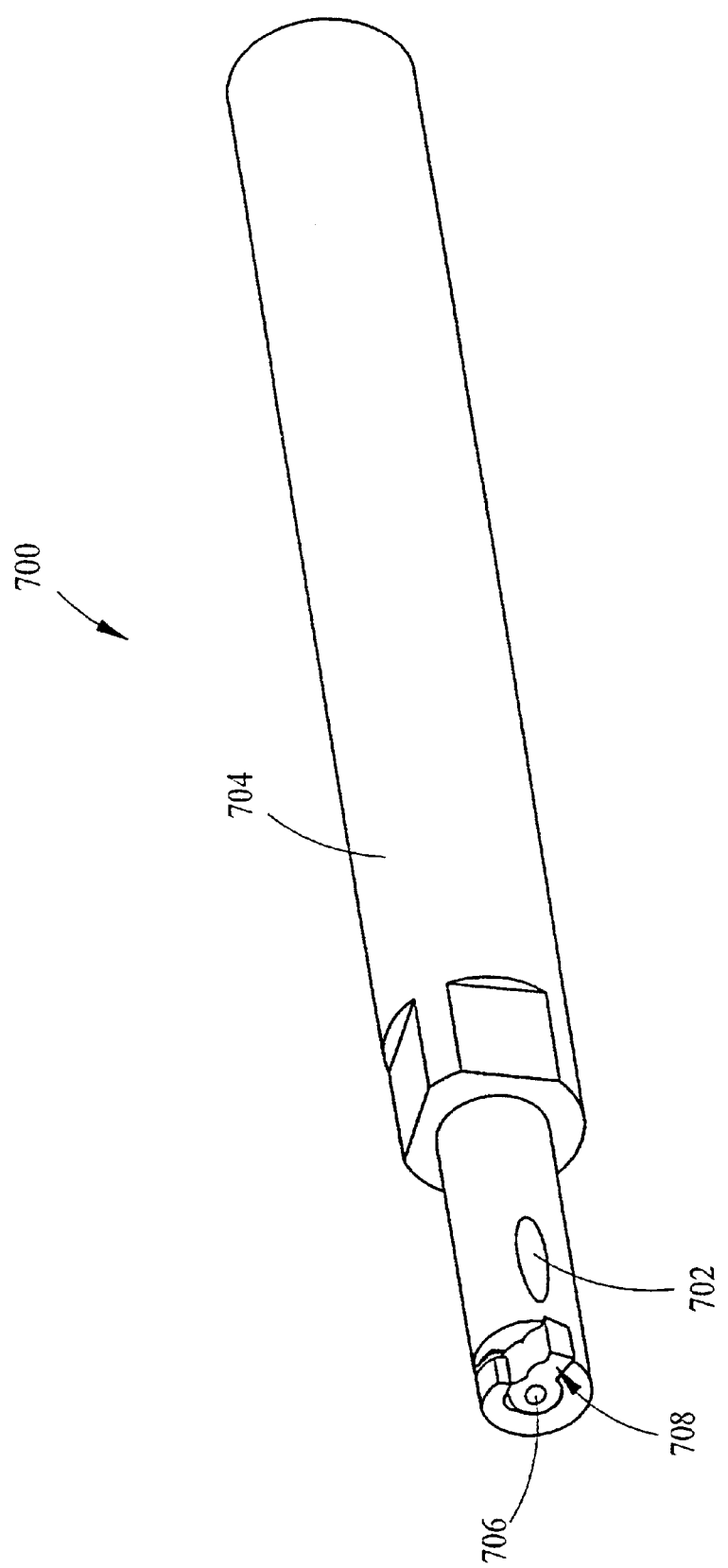

CUTTING TOOL ASSEMBLY

RELATED APPLICATIONS

This is a Continuation-in-Part of the U.S. National Stage Designation in PCT/IL00/00452, filed Jul. 30, 2000.

FIELD OF THE INVENTION

The present invention relates to a cutting tool assembly and to a self-retainable cutting insert therefor to be used in particular in internal turning operations.

BACKGROUND OF THE INVENTION

When performing internal turning operations a tool holder with a cutting insert mounted therein is often used. The tool holder comprises an elongated rod with a cutting insert fastened at its front end by means of a retaining screw. When a machined bore is of a small diameter, for example, in the range of 6 mm or less, the cutting insert and the retaining screw become diminutive which results in difficult handling and poor human engineering. Moreover, the presence of a screw bore in the cutting insert limits the miniaturization of the cutting tool assembly.

A possible solution to the above mentioned problem is to produce the cutting insert and the elongated rod as an integral piece made from cemented carbide. However, such a solution is costly and does not solve the problem of the use of replaceable cutting inserts.

In U.S. Pat. No. 5,836,724 to Satran et al. there is disclosed a replaceable shim (11) for use in pockets (3) of a metal cutting tool (1). Each pocket is defined by a pair of side walls (4, 5) and a base wall (6). An elongated cylindrical recess (7), having a diameter d1, is formed at the junction of the side wall (5) and the base wall (6) and opens into the pocket (3) via an elongated slot (8). The shim (11) is formed by pressing and sintering a metal powder. The shim has an elongated rib (16) formed integrally with a substantially rectangular plate-like body portion (12). The rib is formed with strip portions (19, 20, 21) that lie on a right circular cylindrical envelope of diameter d2. In order to insert the rib (16) into the recess (7), the shim (11) is oriented with respect to the base wall (6) of the pocket (3) by an acute angle α. Then, the rib (16) can be inserted into the recess (7) seeing that its minimum lateral spacing (D2) is not greater than the lateral dimension (D1) of the slot. Now, when the shim is pivotally displaced with respect to the recess (7) towards the base wall (6) of the pocket (3), the strip portions (19, 20, 21) slide in tight, frictional contact with the inner surface of the cylindrical recess (7) until the base surface (14) of the body portion (12) abuts the base wall (6). At this position, the rib (16) is tightly retained within the recess (7) and the shim, as a whole, is retained in the pocket (3).

The cutting tool of '724 is designed to retain a replaceable cutting insert (26) on top of the shim (11). The shim serves as a support to the cutting insert, and, therefore, it is not required to dismantle the shim very often. The fact that the strip portions of the rib slide in tight frictional contact with the inner surface of the recess means that a large number of insertions of a shim within the recess will eventually cause an excessive wear of the pocket thus preventing its further use. Consequently, the cutting tool of '724 is not provided with a resiliently displaceable clamping jaw that enable a quick and easy replacement of a cutting insert without accumulating wear to the insert pocket.

It is the object of the present invention to provide a cutting tool and a replaceable cutting insert therefor that is not affixed by a retaining screw and which can be used, inter alia, for small diameter internal turning operations.

SUMMARY OF THE INVENTION

In accordance with the present invention there is provided a cutting tool assembly (10) comprising a cutting insert holder (12) and a cutting insert (14), the cutting insert holder comprising a body portion (16) and an insert retaining portion (18) the insert retaining portion having a generally cylindrical inner surface (32) of diameter D1 and a longitudinal axis A;

the insert retaining portion (18) comprising a fixed portion (22) connected to the body portion (16) and an axially extending clamping jaw (24) having a radially facing clamping surface (42), the axially extending clamping jaw (24) being connected to the fixed portion (22) on one side along an axially extending juncture (25) and separated from the fixed portion (22) on an other side along an axially extending free end (30) by an axially extending aperture (27), the axially extending aperture (27) being bound by the free end (30) of the clamping jaw (24) on one side and by an axially extending first locating surface (36) of the fixed portion (22), adjacent the inner surface (32), on an opposite side;

the cutting insert (14) comprising a generally cylindrical portion (44) having a longitudinal axis B and an axially extending radial projection (46) connected thereto, the radial projection having upper and lower surfaces (55, 62) connected to the cylindrical portion (44) and being separated by a side surface (57), the upper surface (55) and the side surface (57) meeting at an edge, at least a portion of which constitutes a cutting edge (56), and the lower surface (62) constitutes a first locating surface; and the cutting insert (14) being located in the insert retaining portion (18) with the axially extending radial projection (46) protruding from the axially extending aperture (27) and the first locating surface (62) of the cutting insert abutting the first locating surface (36) of the insert retaining portion (18), characterized in that the clamping jaw (24) being separated from the body portion (16) by a slot (26), being resiliently displaceable relative to the fixed portion (22) and the cutting insert (14) being clamped in position by means of a resilient radial force exerted by the clamping surface (42) of the clamping jaw (24) on the generally cylindrical portion (44) of the cutting insert (14).

In accordance with a preferred embodiment, the cutting insert (14) is provided with an axially extending centrally located through bore (66) and the cutting insert holder (12) is provided with an associated centrally located bore (43) opening out into a back wall (45) of the insert retaining portion (18).

Preferably, the cylindrical portion (44) is of an axial extent greater than the axial extent of the radial projection (46).

In accordance with a preferred embodiment of the present invention, the generally cylindrical portion (44) of the cutting insert (14) is provided with three axially extending ribs (50, 52, 54).

Typically, two of the three axially extending ribs (50, 52) have radially outermost regions that lie on a cylindrical envelope of diameter D2 having as axis the longitudinal axis B.

Typically, D2 is equal to D1.

Further typically, one of the three axially extending ribs (54) has a radially outermost region that lies on a cylindrical envelope of diameter D3.

Preferably, D3 is greater than D1.

Further preferably, D3 is greater than D2.

In accordance with a preferred embodiment of the present invention, the three axially extending ribs (50, 52, 54) are angularly disposed by 120° one from another, with respect to the axis B.

Typically, the cutting insert is clamped in position with the clamping surface (42) of the clamping jaw (24) abutting the axially extending rib (54) of the generally cylindrical portion (44).

In accordance with a preferred embodiment of the present invention, the clamping jaw (24) is wider at the juncture (25) than at the free end (30) and tapers from the juncture to the free end.

Further in accordance with a preferred embodiment of the present invention, the clamping jaw (24) is thicker at the juncture (25) than at the free end (30).

Yet further in accordance with a preferred embodiment of the present invention, the axially extending first locating surface (62) of the cutting insert (14) and the axially extending first locating surface (36) of the fixed portion (22) of the insert retaining portion (18) are planar.

Still yet further in accordance with a preferred embodiment of the present invention, the insert retaining portion (18) of the cutting insert holder (12) is further provided with a generally axially directed second locating surface (38) adjacent the first locating surface (36) and transverse thereto, the cutting insert (14) is provided with a second locating surface (64) adjacent the first locating surface (62) and transverse thereto, and wherein the second locating surface (64) of the cutting insert (14) abuts the second locating surface (38) of the cutting insert holder (12).

In accordance with one specific application of the present invention, the axially extending first locating surface of the cutting insert is in the form of a generally V-shaped protrusion (143) and the axially extending first locating surface of the fixed portion of the insert retaining portion is in the form of a complementary shaped V-shaped groove (135).

In accordance with another specific application of the present invention, the axially extending first locating surface (343) of the cutting insert is convex and the axially extending first locating surface of the fixed portion of the insert retaining portion is a complementary shaped concave surface (335).

In accordance with another specific application of the present invention, the axially extending first locating surface (243) of the cutting insert is concave and the axially extending first locating surface of the fixed portion of the insert retaining portion is a complementary shaped convex surface (235).

In accordance with a preferred embodiment of the present invention, the clamping jaw (24) is further provided with an axially extending groove (40) merging with the clamping surface (42) of the clamping jaw.

In accordance with another embodiment of the present invention, the cutting insert is generally symmetrical about a symmetry plane (M) and has two sets of cutting edges (456', 456") on both sides of the symmetry plane.

In accordance with the present invention, there is provided a cutting insert (14) for use with the cutting tool assembly (10) according to the present invention, the generally cylindrical portion is provided with three axially extending ribs, two of the three axially extending ribs (50, 52) have radially outermost regions that lie on a cylindrical envelope of diameter D2 having as axis the longitudinal axis B.

characterized in that at least a portion of the edge constitutes a cutting edge (56), one of the three axially extending ribs (54) has a radially outermost region that lies on a cylindrical envelope of diameter D3 and wherein the diameter D3 is greater than the diameter D2.

In accordance with a preferred embodiment, the cutting insert (14) is provided with an axially extending centrally located through bore (66).

In accordance with a preferred embodiment of the present invention, the three axially extending ribs (50, 52, 54) are angularly disposed by 120° one from another, with respect to the axis B.

Further in accordance with a preferred embodiment of the present invention, the first locating surface (62) is planar.

Still further in accordance with the present invention, the radial projection (46) is provided with a second locating surface (64) adjacent the first locating surface (62) and transverse thereto.

In accordance with one specific application of the present invention, the axially extending first locating surface of the cutting insert is in the form of a generally V-shaped protrusion (143).

In accordance with another specific application of the present invention, the axially extending first locating surface (343) of the cutting insert is convex.

In accordance with another specific application of the present invention, the axially extending first locating surface (243) of the cutting insert is concave.

In accordance with the present invention, there is yet further provided an insert key (70, 500) for use with the cutting tool assembly according to the present invention, for mounting the cutting insert (14) on the cutting insert holder (12), the insert key comprising:

a peripheral surface (71) extending from a rear portion (73) of the insert key to a front portion (75) thereof and comprising a side surface (72) and a front surface (74);

a cavity (76) having a generally cylindrical inner side wall (80), the cavity opening to the front surface (74) into a substantially circular aperture (77) and opening into the side surface (72) into a substantially rectangular aperture (78) extending axially along the cavity (76) from the front surface (74) where the circular and rectangular apertures join.

In accordance with one embodiment, the insert key (70) is further provided with an elongated pin (92) concentric with the cylindrical inner side wall (80) and extending from the rear portion (73) of the insert key towards the front surface (74).

If desired, the insert key (500) is provided with an open ended sleeve (510) made from resilient material and slidably insertable into the cavity (76), the sleeve (510) having a generally cylindrical cavity (512) and a substantially rectangular aperture (513) extending along the sleeve and coinciding with the rectangular aperture (78) in the side surface of the insert key when the sleeve is located in the cavity (76).

In accordance with the present invention, there is still yet further provided an insert key (70a) for use with a cutting tool assembly according to the present invention, for removing the cutting insert (14) from the cutting insert holder (12), the insert key comprising:

a peripheral surface (71) extending from a rear portion (73) of the insert key to a front portion (75) thereof and comprising a side surface (72) and a front surface (74);

a cavity (76) having a generally cylindrical inner side wall (80), the cavity opening to the front surface (74) into a substantially circular aperture (77) and opening into the side surface (72) into a substantially rectangular aperture (78) extending axially along the cavity (76) from the front surface (74) where the circular and rectangular apertures join;

a first transverse aperture (79a) located rearward of the front surface, the transverse aperture opening from the inner side wall into the side surface and extending on the side surface transversely from the substantially rectangular aperture.

If desired, the insert key (70a) is provided with a second transverse aperture (81a) opposite the first transverse aperture with respect to the rectangular aperture (78).

In accordance with one embodiment, the insert key (70a) is further provided with an elongated pin (92) concentric with the cylindrical inner side wall (80) and extending from the rear portion (73) of the insert key towards the front surface (74).

There is also provided in accordance with the present invention, an insert key (600) for use with a cutting tool assembly according to the present invention, for mounting the cutting insert (14) on the cutting insert holder (12), the insert key (600) comprising a base plate (602) having a plurality of insert retaining pockets (604), each insert retaining pocket comprising a peripheral surface (606) and an axial abutment surface (608) connected thereto, two retaining members (616, 618) shearingly connected to the base plate (602) detachingly retaining the generally cylindrical portion (44) of the cutting insert (14) and a cutting insert rotation prevention stopper (614) connected to the base plate (602).

In accordance with a preferred embodiment, the cutting insert rotation prevention stopper (614) is a tangentially directed portion of a radially outwardly extending groove (612) in the base plate (602).

Further in accordance with a preferred embodiment, the insert retaining pocket (604) is provided with two apertures (615, 617) located between the axial abutment surface (608) and the peripheral surface (606), a retaining member (616, 618) is located above each aperture (615, 617), the size and shape of each aperture being such as to allow the free passage of the retaining members therethrough in an axial direction.

Preferably, the retaining members (616, 618) are shearingly connected to the axial abutment surface (608) by a rim (610).

In accordance with the present invention, the slot (26) having a periphery (29) and an inner portion (31) and wherein the slot being slanted rearwardly from its periphery towards its inner portion.

In accordance with the present invention there is provided a cutting tool assembly (10) comprising a cutting insert holder (12) and a cutting insert (14), the cutting insert holder comprising a body portion (16) and an insert retaining portion (18) the insert retaining portion having a generally cylindrical inner surface (32) of diameter D1 and a longitudinal axis A;

the insert retaining portion (18) comprising a fixed portion (22) connected to the body portion (16) and an axially extending clamping jaw (24) having a radially facing clamping surface (42), the axially extending clamping jaw (24) being connected to the fixed portion (22) on one side along an axially extending juncture (25) and separated from the fixed portion (22) on an other side along an axially extending free end (30) by an axially extending aperture (27), the axially extending aperture (27) being bound by the free end (30) of the clamping jaw (24) on one side and by an axially extending first locating surface (36) of the fixed portion (22), adjacent the inner surface (32), on an opposite side;

the cutting insert (14) comprising a generally cylindrical portion (44) having a longitudinal axis B and an axially extending radial projection (46) connected thereto, the radial projection having upper and lower surfaces (55, 62) connected to the cylindrical portion (44) and being separated by a side surface (57), the upper surface (55) and the side surface (57) meeting at an edge, at least a portion of which constitutes a cutting edge (56), and the lower surface (62) constitutes a first locating surface; and the cutting insert (14) being located in the insert retaining portion (18) with the axially extending radial projection (46) protruding from the axially extending aperture (27) and the first locating surface (62) of the cutting insert abutting the first locating surface (36) of the insert retaining portion (18), characterized in that the clamping jaw (24) being separated from the body portion (16) by a slot (26), being resiliently displaceable relative to the fixed portion (22) and the cutting insert (14) being clamped in position by means of a resilient radial force exerted by the clamping surface (42) of the clamping jaw (24) on the generally cylindrical portion (44) of the cutting insert (14), and wherein in a first clamping position the clamping surface (42) of the clamping jaw (24) lies on a cylindrical envelope having a second diameter (D2), wherein in a second clamping position the clamping surface (42) of the clamping jaw (24) lies on a cylindrical envelope having a third diameter (D3) and wherein the third diameter being larger than the second diameter.

BRIEF DESCRIPTION OF THE DRAWINGS

For a better understanding of the present invention and to show how the same may be carried out in practice, reference will now be made to the accompanying drawings, in which:

FIG. 21 is a perspective view of an internal turning cutting tool in accordance with the present invention.

DETAILED DESCRIPTION OF THE INVENTION

Figure 1:
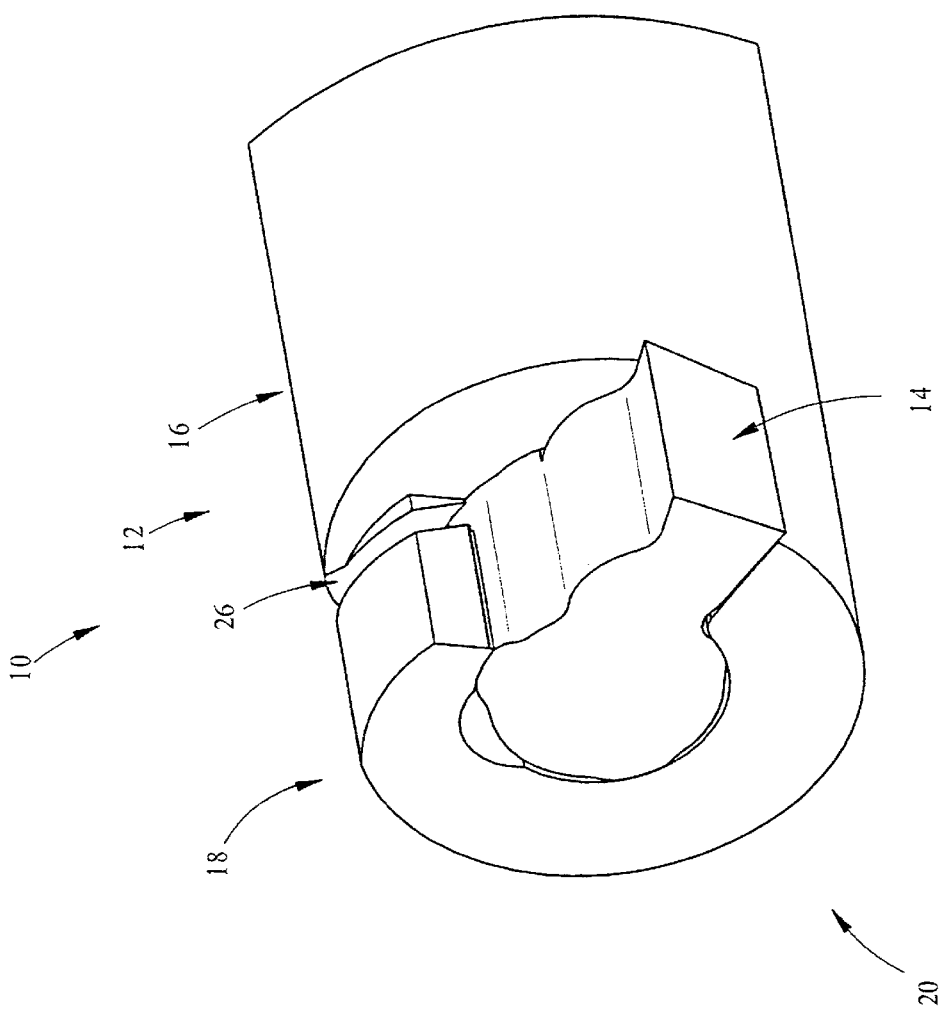
FIG. 1 is a partial perspective view of a cutting tool assembly according to the present invention.
Figure 2:
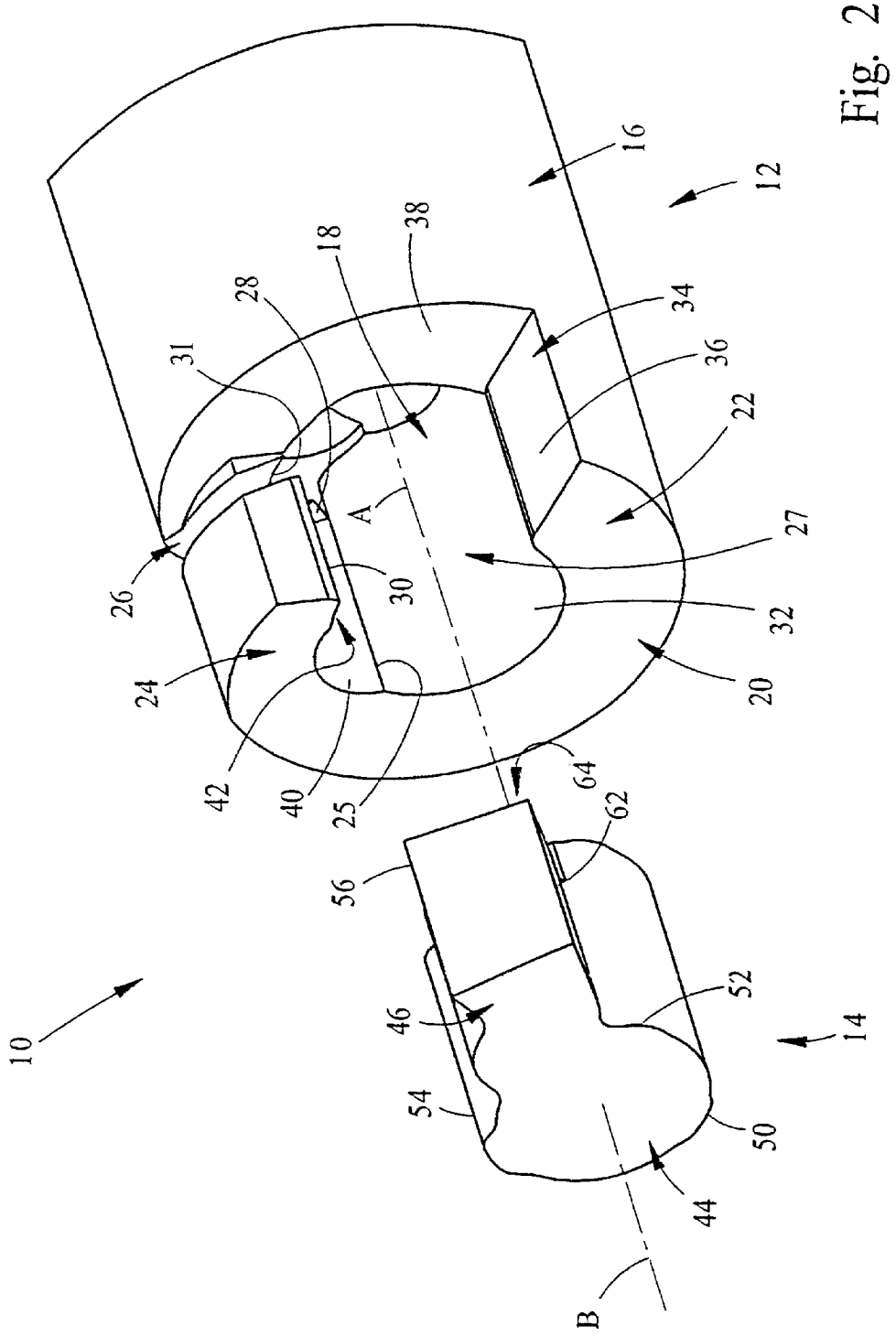
FIG. 2 is an exploded view of the cutting tool assembly of FIG. 1.
Figure 5:
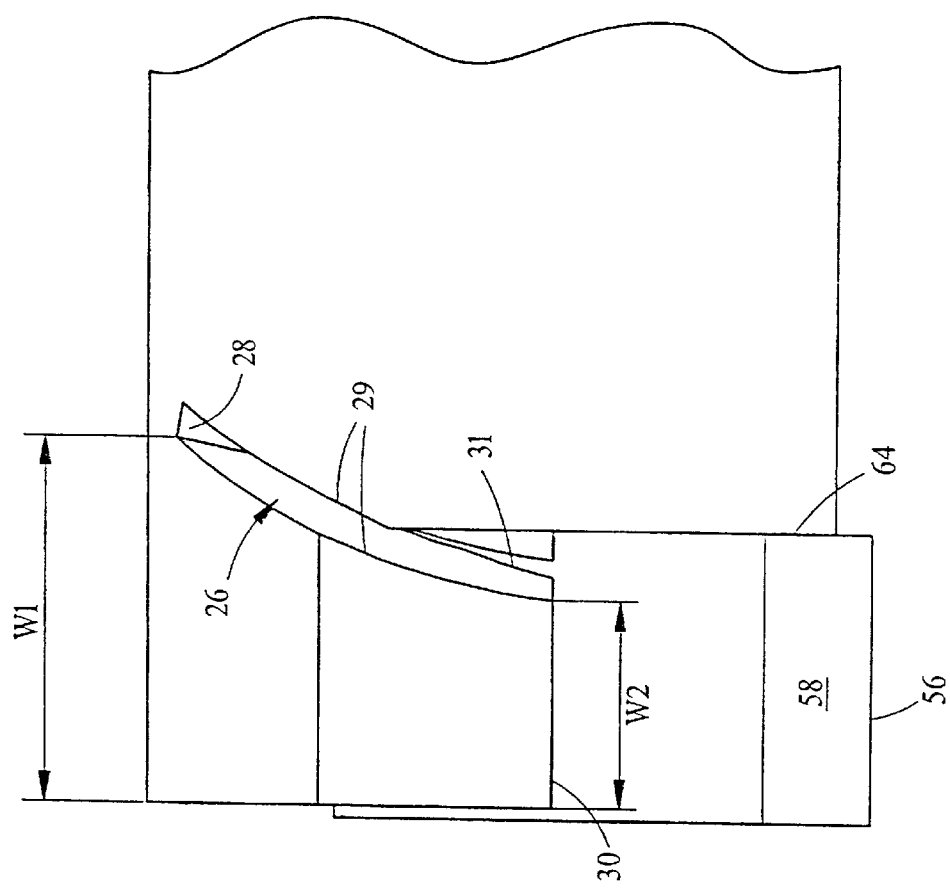
FIG. 5 is a top view of the front portion of the cutting tool assembly of FIG. 1.

Attention is first drawn to FIGS. 1 to 5. As shown, a cutting tool assembly 10 comprises a cutting insert holder 12 and a cutting insert 14 mounted therein. The cutting insert holder 12 has a body portion 16, and, an insert retaining portion 18, in a front portion 20 thereof. The insert retaining portion has a longitudinal axis A, and comprises a fixed portion 22 integrally connected to the body portion and an axially extending clamping jaw 24 connected to the fixed portion on one side along an axially extending juncture 25. An axially extending aperture 27 separates between a free end 30 of the clamping jaw and an axially extending tangentially directed surface 36, constituting a first locating surface. The clamping jaw 24 is separated from the tool body 16 by a slot 26. As seen in FIG. 5, the slot 26 is slanted so that the width W1 of the clamping jaw 24 adjacent the bottom 28 of the slot 26, i.e. at the juncture 25, is larger than the width W2 of the free end 30 thereof. Also, as best seen in FIGS. 2 and 5, the slot 26 is slanted rearwardly from its periphery 29 towards its inner portion 31.

Figure 3:
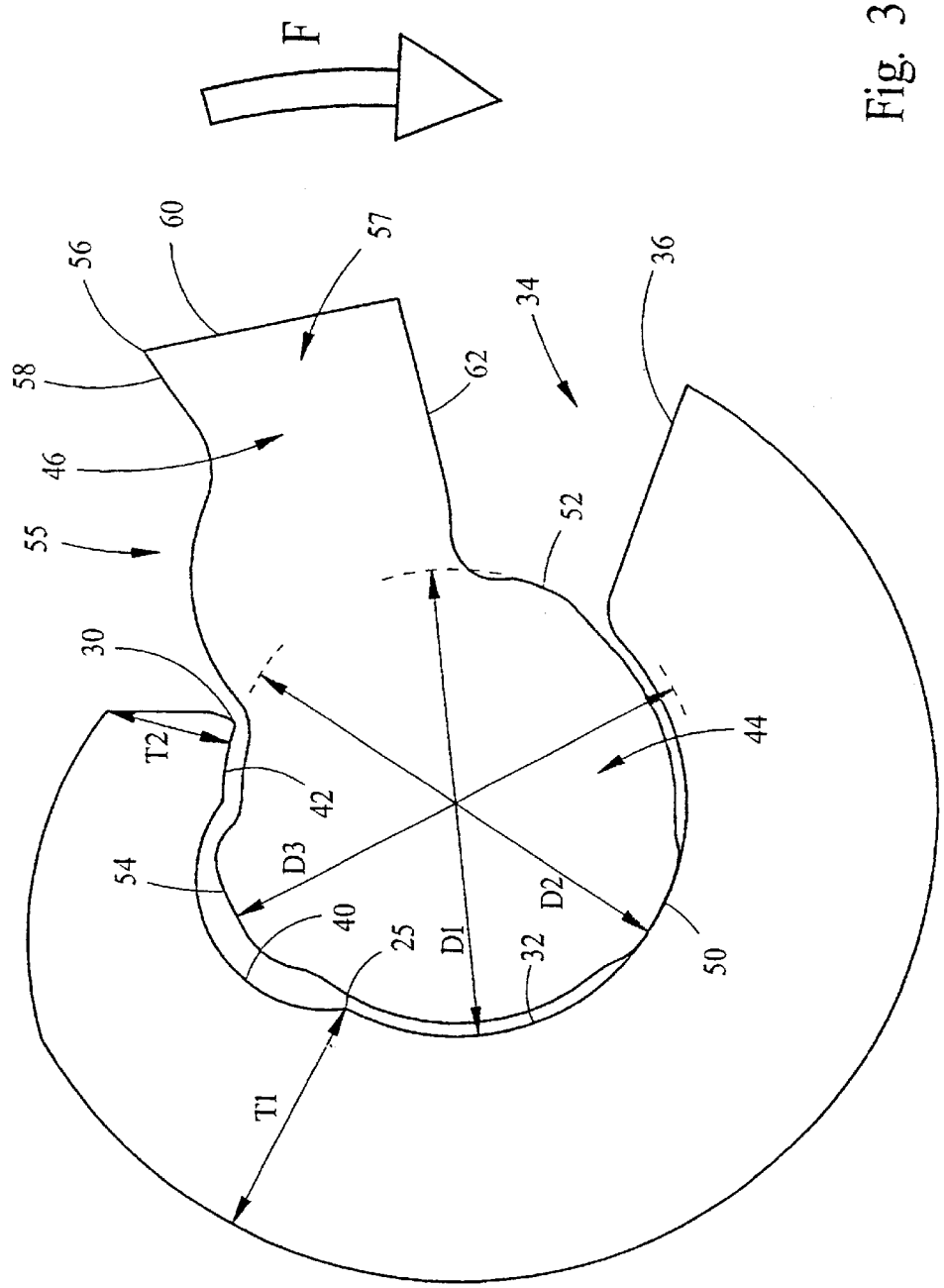
FIG. 3 is an end view of the insert retaining portion of FIG. 2 with the cutting insert located therein prior to rotation of the cutting insert.
Figure 4:
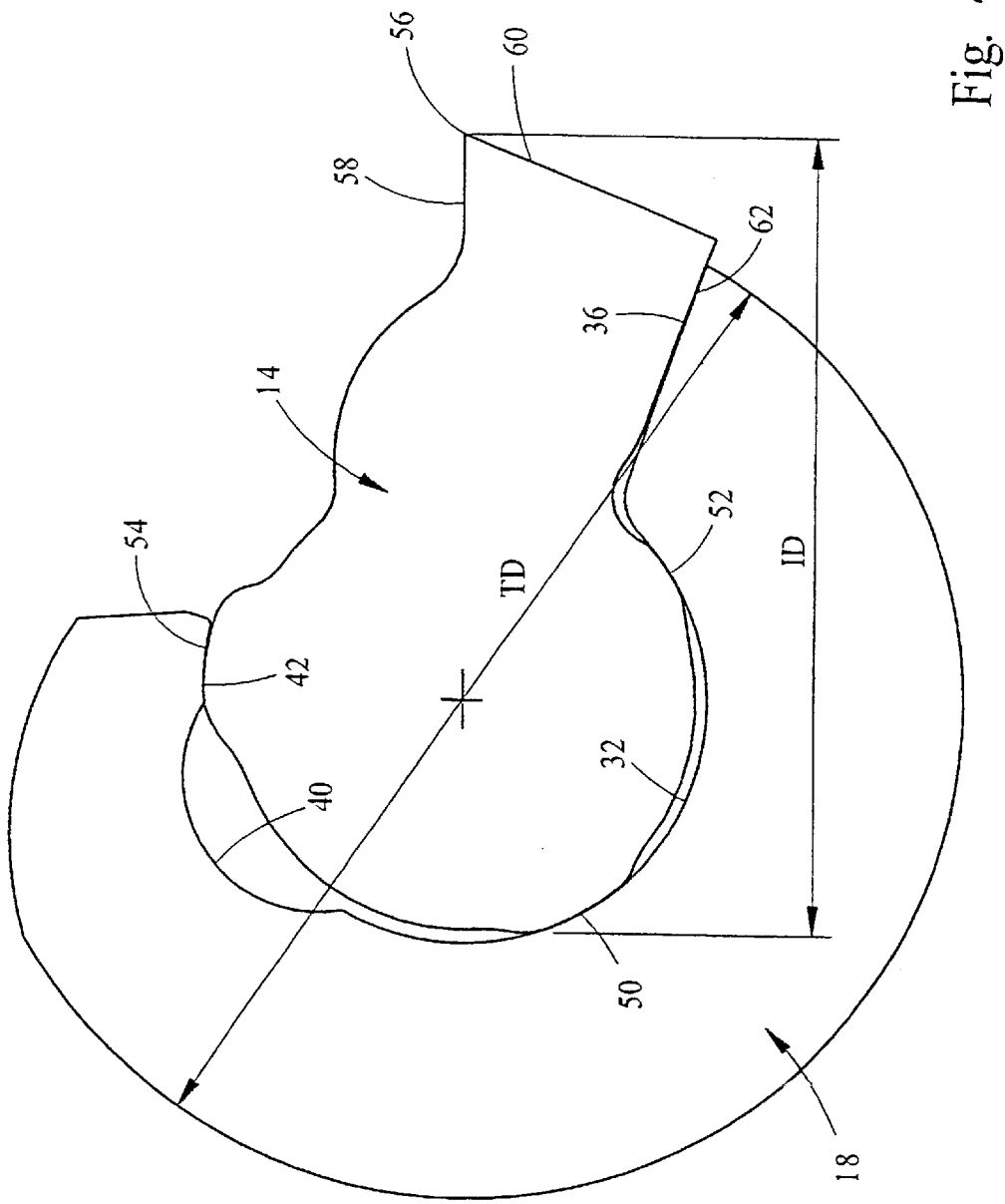
FIG. 4 is an end view of the insert retaining portion of FIG. 2 with the cutting insert clamped therein.

As shown in FIG. 3, the clamping jaw 24 has a thickness T1 in the region of the juncture 25 and a thickness T2 at the free end 30, where T1 is greater than T2. Therefore, the clamping jaw 24 tapers towards its free end 30 both in width and thickness, thus enabling better rigidity of the resilient portion.

The fixed portion 22 has an inner surface 32 and an outer portion 34. The outer portion 34 comprises a first locating surface 36 adjacent the inner surface 32 and a flat, generally axially directed, second locating surface 38 adjacent to the first locating surface 36. In the embodiment shown in FIG. 2, the first locating surface constitutes a tangential abutment surface and the second locating surface is perpendicular thereto and constitutes an axial abutment surface. The inner surface 32 lies on a cylindrical envelope of diameter D1 having as axis the axis A.

The clamping jaw 24 has on its inner side an axially extending groove 40 along the entire width thereof. The groove 40 merges, on one side thereof, with the inner abutment surface 32 and, on the other side thereof, with a clamping surface 42 close to the free end 30 and remote from the fixed portion 22. The clamping surface 42 lies on the same cylindrical envelope as that of the inner abutment surface 32.

The cutting insert 14 comprises a generally cylindrical portion 44 having a longitudinal axis B and an axially extending radial projection 46. The cylindrical portion has three axially extending ribs 50, 52 and 54, preferably angularly displaced by 120° one from another, with respect to the axis B. The radial outermost region of each of the first and second ribs 50 and 52, respectively, constitute abutment surfaces for abutting the inner surface 32 of the fixed portion 22, and lie on a cylindrical envelope of diameter D2 and have as axis the longitudinal axis B. The diameter D2 is preferably equal to D1. The radial outermost region of the third rib 54 constitutes a clamping abutment surface to be abutted by the clamping surface 42 of the clamping jaw 24 and lies on a cylindrical envelope of diameter D3 greater than D1.

The axially extending radial projection 46 has respective upper and lower surfaces 55, 62 connected to the cylindrical portion 44 and being separated by a side surface 57. At a radial extremity of the radial projection 46, a cutting edge 56 is defined between a rake surface 58 in the upper surface 55 and a relief surface 60 in the side surface 57. The lower surface 62 of the radial projection 46 is flat, generally tangentially directed and constitutes a first locating surface of the cutting insert. The rear portion of the side surface 57 is flat, generally axially directed and constitutes a second locating surface 64 of the cutting insert. In the embodiment shown in FIG. 2 the first locating surface 62 constitutes a tangential abutment surface of the cutting insert and is perpendicular to the second locating surface 64 that constitutes an axial abutment surface of the cutting insert.

The cutting tool assembly 10, of the present invention, is particularly useful in small diameter cutting tools performing internal turning operations. Such tools are used inside bores having an internal diameter in the range of 3 mm to 6 mm. The insert retaining portion 18 has a diameter TD in the range of 3 to 6 mm, preferably about 4 mm. The insert overall dimension ID is in the range of 2 to 6 mm and preferably in the range of 3 to 5 mm.

Figure 6:
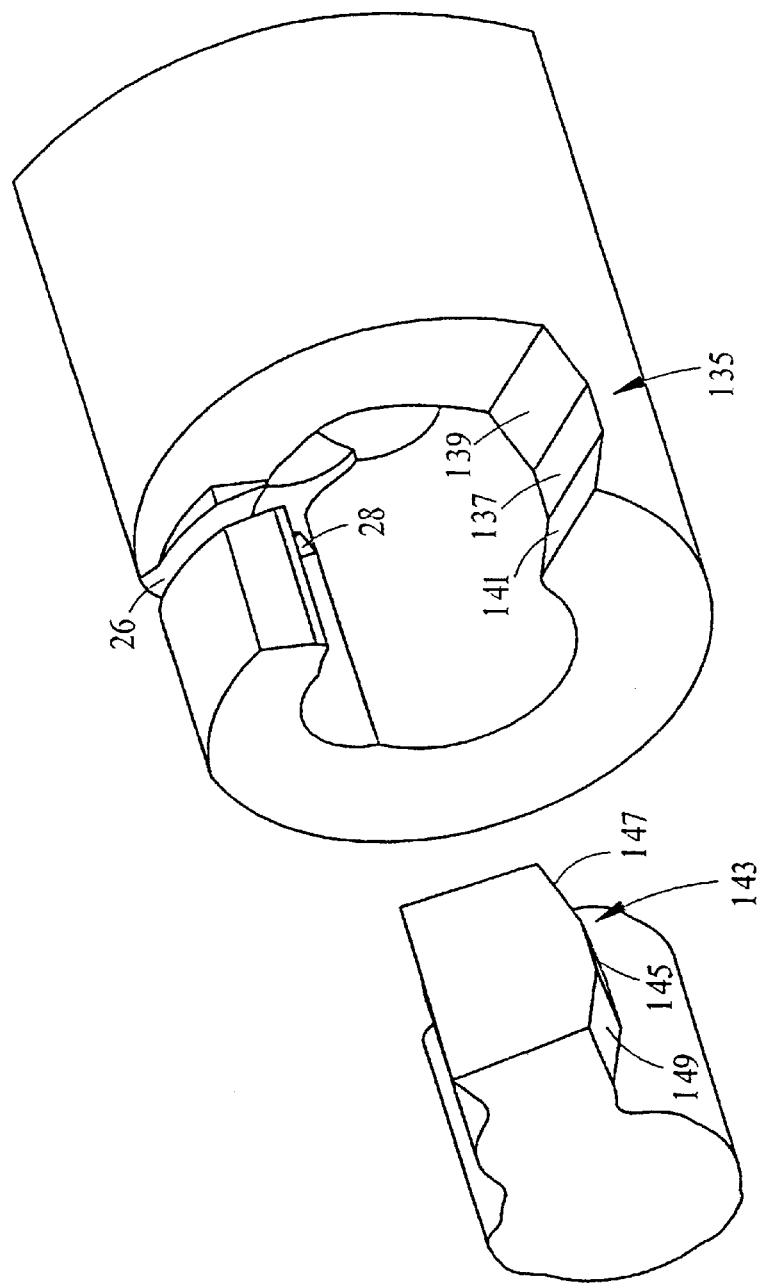
FIG. 6 is an exploded perspective view of another embodiment of an insert retaining portion according to the present invention wherein the first locating surface has a V-shaped groove and the cutting insert has a complementary V-shaped protrusion.
Figure 7:
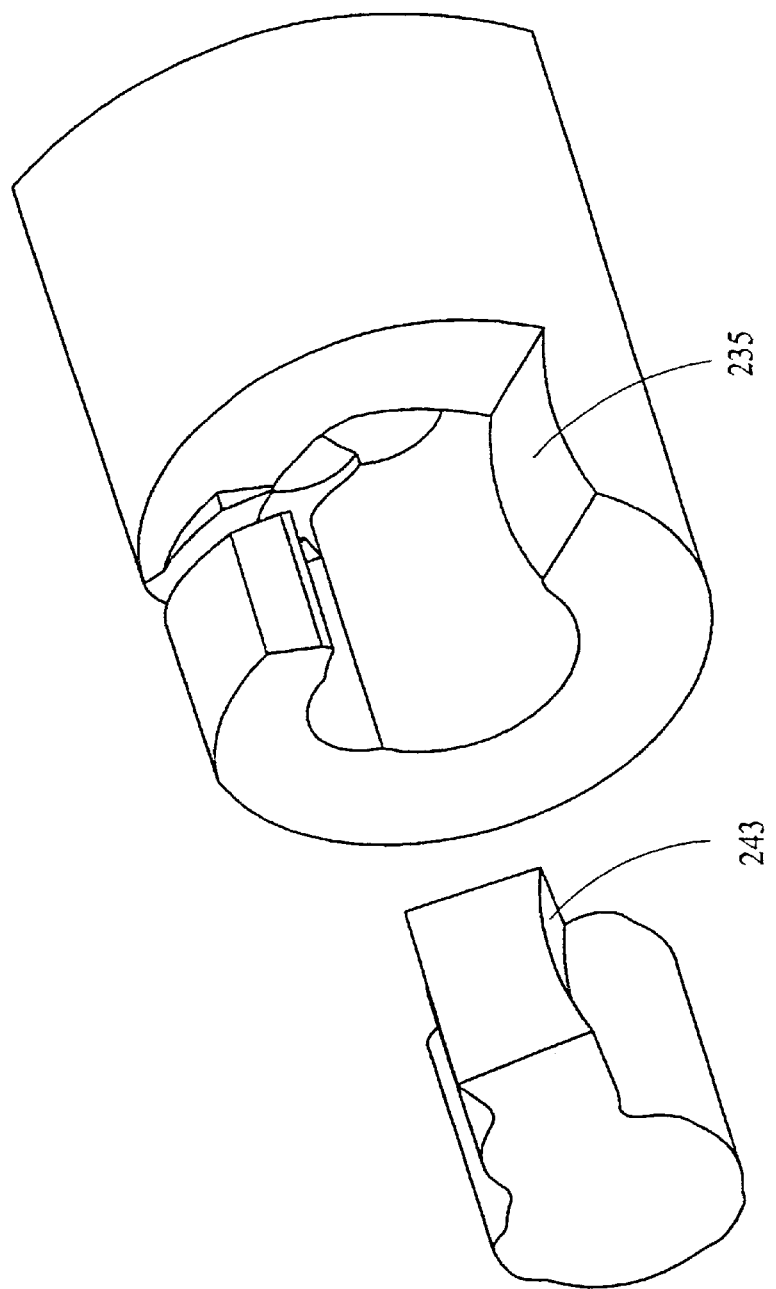
FIG. 7 is an exploded perspective view of another embodiment of an insert retaining portion according to the present invention wherein the first locating surface is convex and the cutting insert has a complementary concave surface.
Figure 8:
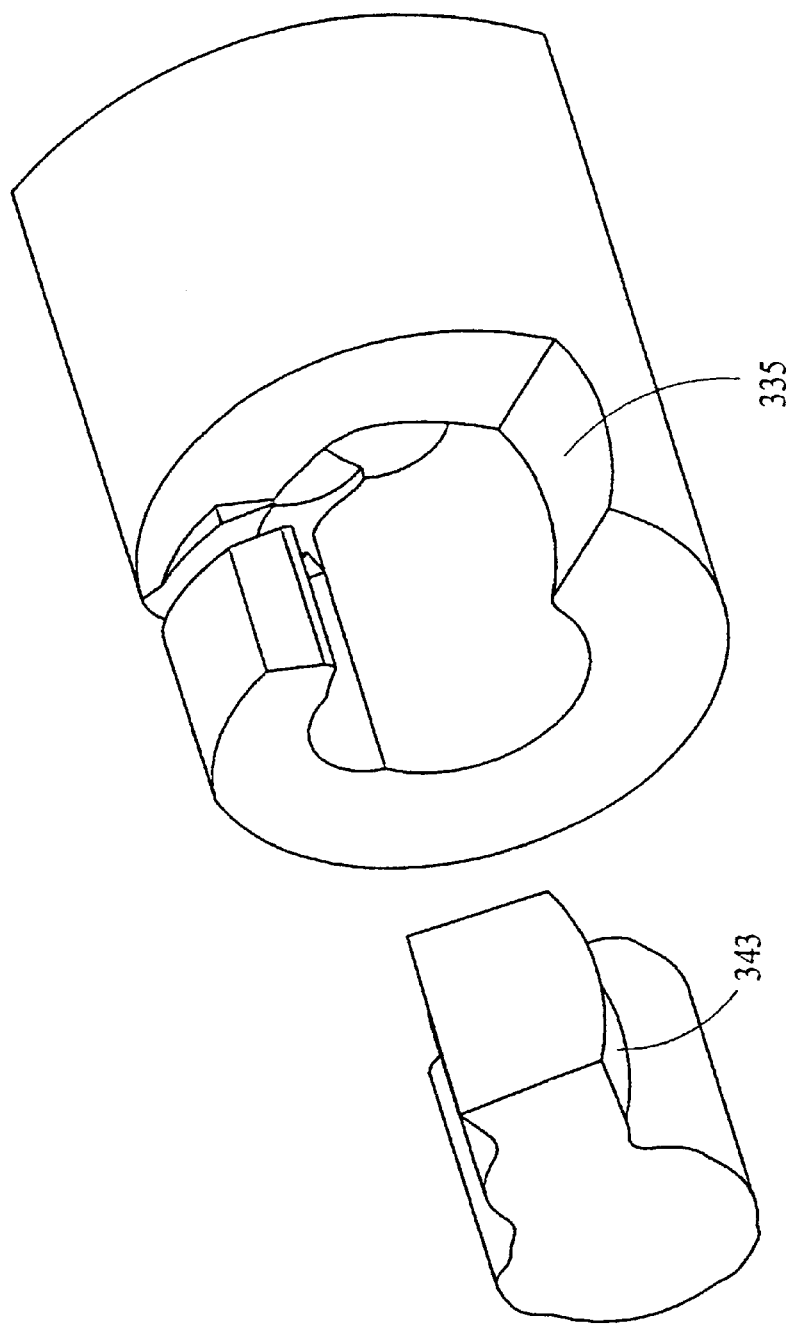
FIG. 8 is an exploded perspective view of another embodiment of an insert retaining portion according to the present invention wherein the first locating surface is concave and the cutting insert has a complementary convex surface.

Attention is now drawn to FIGS. 6, 7 and 8 which show three further embodiments of the invention. These embodiments are particularly useful for cutting operations in which forwardly directed axial forces tend to extract the cutting insert from the insert retaining portion.

All three embodiments are based on replacing the planar tangential abutment surfaces 36 and 62 by non-planar surfaces. Since the non-planar abutment surfaces inherently contain both tangential and axial abutment surface components, the axial abutment surface 38, shown in FIG. 2, is not required for these three embodiments. In FIG. 6, the planar tangential abutment surface 36 is replaced by an axially extending generally tangentially facing V-shaped groove 135 comprising a central portion 137 and respective rear and front peripheral portions 139 and 141 and the planar tangential abutment surface 62 is replaced by a complementary axially extending generally tangentially facing generally V-shaped protrusion 143 comprising a central portion 145 and respective rear and front peripheral portions 147 and 149. In FIG. 7, the planar tangential abutment surface 36 is replaced by an axially extending generally tangentially facing convex surface 235 and the planar tangential abutment surface 62 is replaced by an axially extending generally tangentially facing concave surface 243 formed to mate with the convex surface 235. In FIG. 8, the planar tangential abutment surface 36 is replaced by an axially extending generally tangentially facing concave surface 335 and the planar tangential abutment surface 62 is replaced by an axially extending generally tangentially facing convex surface 343 formed to mate with the concave surface 335.

Figure 9:
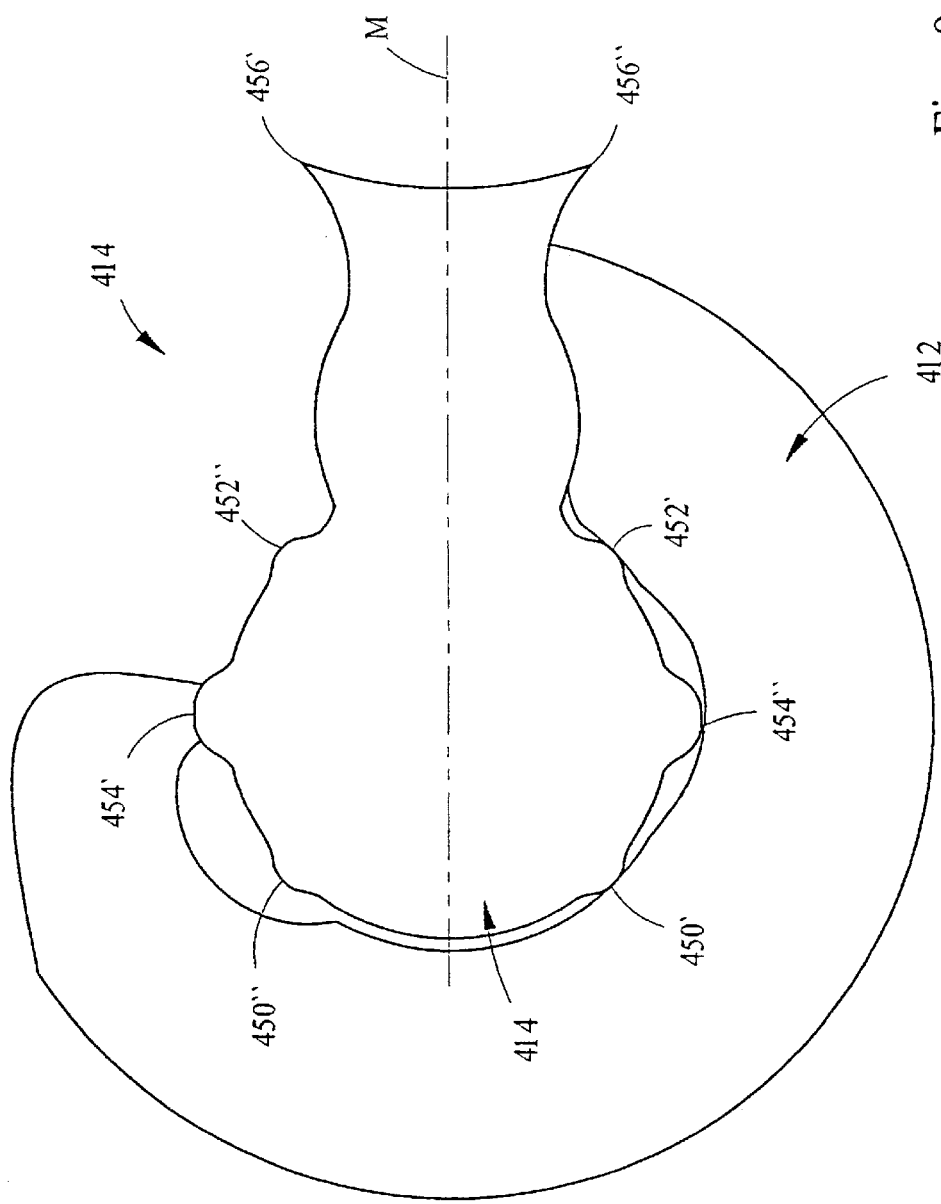
FIG. 9 is a schematic end view of the insert retaining portion according to the present invention with a double-sided cutting insert mounted therein.

FIG. 9 shows the application of the present invention to a double-sided cutting insert 414 clamped in a cutting insert holder 412. The cutting insert 414 is similar in construction to the cutting insert 14 except that it is generally symmetrical about a symmetry plane M. The cutting insert 414 has two sets of cutting edges 456', 456" on both sides of the symmetry plane M and, symmetrical with respect to the symmetry plane M, two sets of first abutment surfaces 450', 450", second abutment surfaces 452', 452" and clamping abutment surfaces 454', 454". When the cutting insert 414 is clamped in the cutting insert holder 412 with the cutting edge 456' being the effective cutting edge, only one set of abutment surfaces 450', 452', 454' is in abutted position while the other set 450", 452", 454" remains free.

Figure 10:
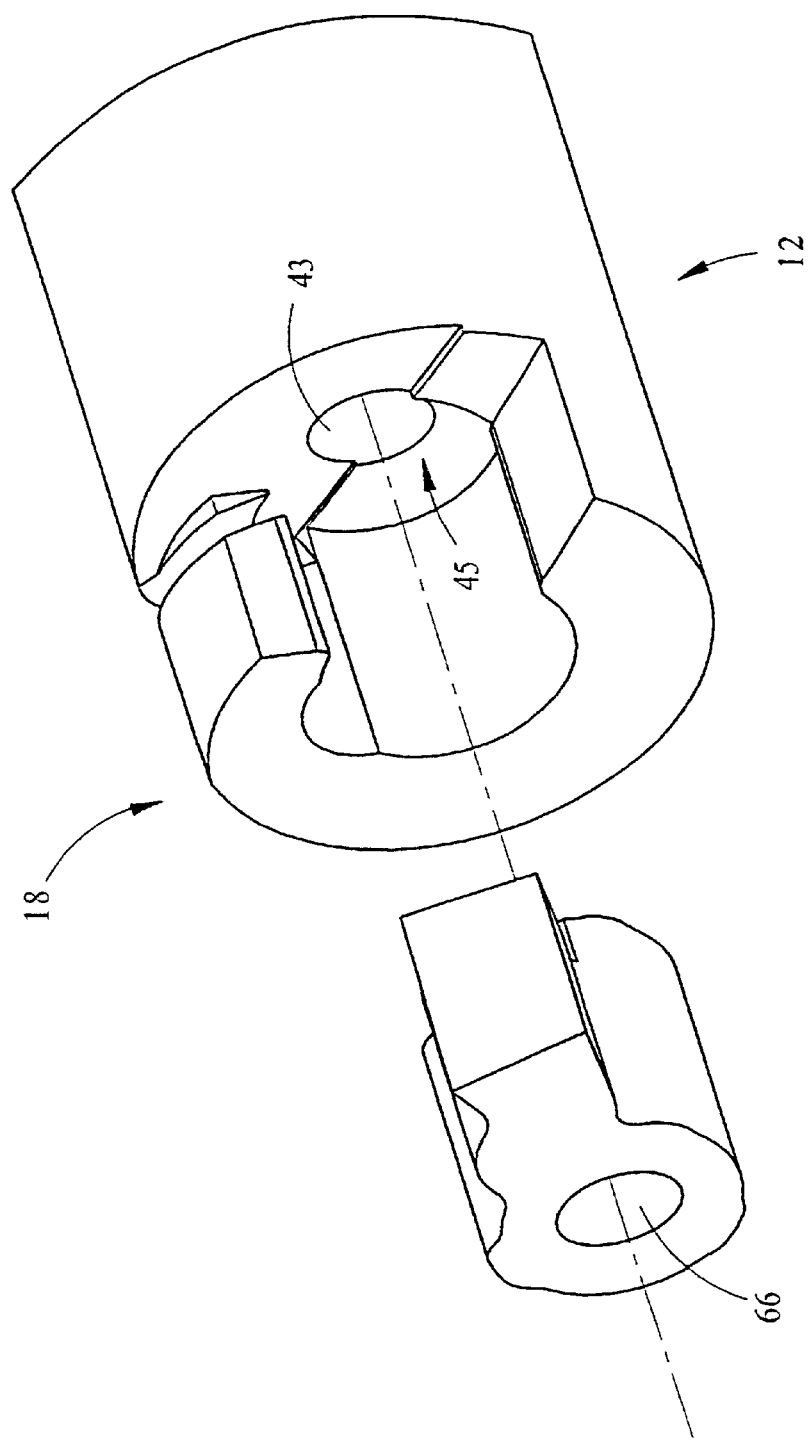
FIG. 10 is an exploded view of a cutting tool assembly according to the present invention wherein the cutting insert holder has a centrally located bore and the cutting insert has a through bore.

Attention is now drawn to FIG. 10 which shows another embodiment of the cutting tool assembly in which the cutting insert is provided with an axially extending centrally located through bore 66, and the cutting insert holder 12 is provided with an associated centrally located bore 43 opening out into the back wall 45 of the insert retaining portion 18. As will be described in greater detail below, the bores 66 and 43 can be utilized during the assembling and disassembling of the cutting tool assembly. The bores 66 and 43 can also serve as cooling fluid ducts.

Figure 11:
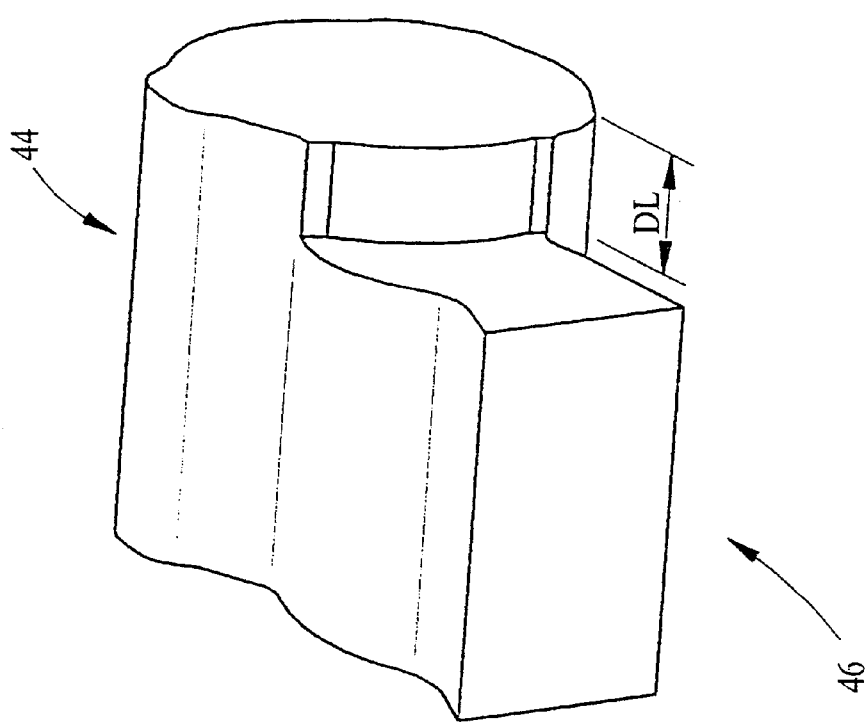
FIG. 11 is a perspective view of a cutting insert according to the present invention with an extended rear cylindrical portion.

FIG. 11 shows a further embodiment of a cutting insert of the invention in which the axially extending cylindrical portion 44 extends beyond the axially extending radial projection 46 by an amount DL. For this particular embodiment the back wall 45 of the insert retaining portion 18 will be correspondingly recessed by an amount DL. This embodiment affords additional stability to the cutting tool assembly should the clamping force applied on the cutting insert become weaker.

The assembling of the cutting tool assembly 10 will now be described with respect to the cutting insert 14 and the cutting insert holder 12 shown in FIGS. 1 to 5. First, the central portion 44 is placed in front of the insert retaining portion 18 co-axially with the axis A and oriented such that the rib 54 is aligned with the groove 40. Next, the cutting insert 14 is introduced into the insert retaining portion 18 of the cutting insert holder until the tangential abutment surface 62 of the radial projection 46 is opposite the tangential abutment surface 36 of the outer portion 34, which, in this embodiment, is achieved by the abutment of the axial abutment surface 64 against the axial abutment surface 38. The geometry of the groove 40 is such that it is capable of freely receiving therein the rib 54. In this position, the rib 52 of the central portion 44 is located outside the inner surface 32 and the entire cutting insert 14 is freely displaceable within the insert retaining portion 18. Finally, the cutting insert 14 is rotated in a clockwise direction, as shown by the arrow F in FIG. 3, until the tangential abutment surface 62 of the radial projection 46 abuts the tangential abutment surface 36 of the fixed portion 22. In this position, the ribs 50 and 52, abut the inner surface 32 and the clamping surface 42 abuts the rib 54 thereby clamping the cutting insert in the insert retaining portion.

Due to the fact that the rib 54 lies on a cylindrical envelope of diameter D3 that is greater than the diameter D1 on which lies the clamping surface 42, the clamping jaw 24 is radially outwardly displaced thereby effecting a resilient clamping upon the cutting insert 14. Thus, the cutting insert 14 is securely clamped within the insert retaining portion 18. The removing of the cutting insert 14 is carried out in the reverse order.

It will be apparent that the assembling of a cutting tool assembly having cutting inserts and associated cutting insert holders shown in FIGS. 6, 7 and 8, is performed in a similar manner.

The assembling of the cutting tool assembly, as procedurally described above, requires the use of an insert mounting key. This is the case since the cutting insert is usually very small and therefore difficult to handle. Furthermore, when clamping the cutting insert in the insert retaining portion a torque has to be applied to the cutting insert in order to forcibly displace the clamping jaw radially outward. This torque is normally greater than the torque than can be normally applied without the use of an implement. Similarly, the disassembling of a cutting tool assembly, i.e. the removal of a cutting insert from a cutting insert holder, requires the use of an insert removing key. In the following description and claims, reference will be made generically to an "insert key", since the two types of keys have basically a similar structure. Where necessary, for the sake of clarity, reference will be made to the particular type of key in question.

Figure 12:
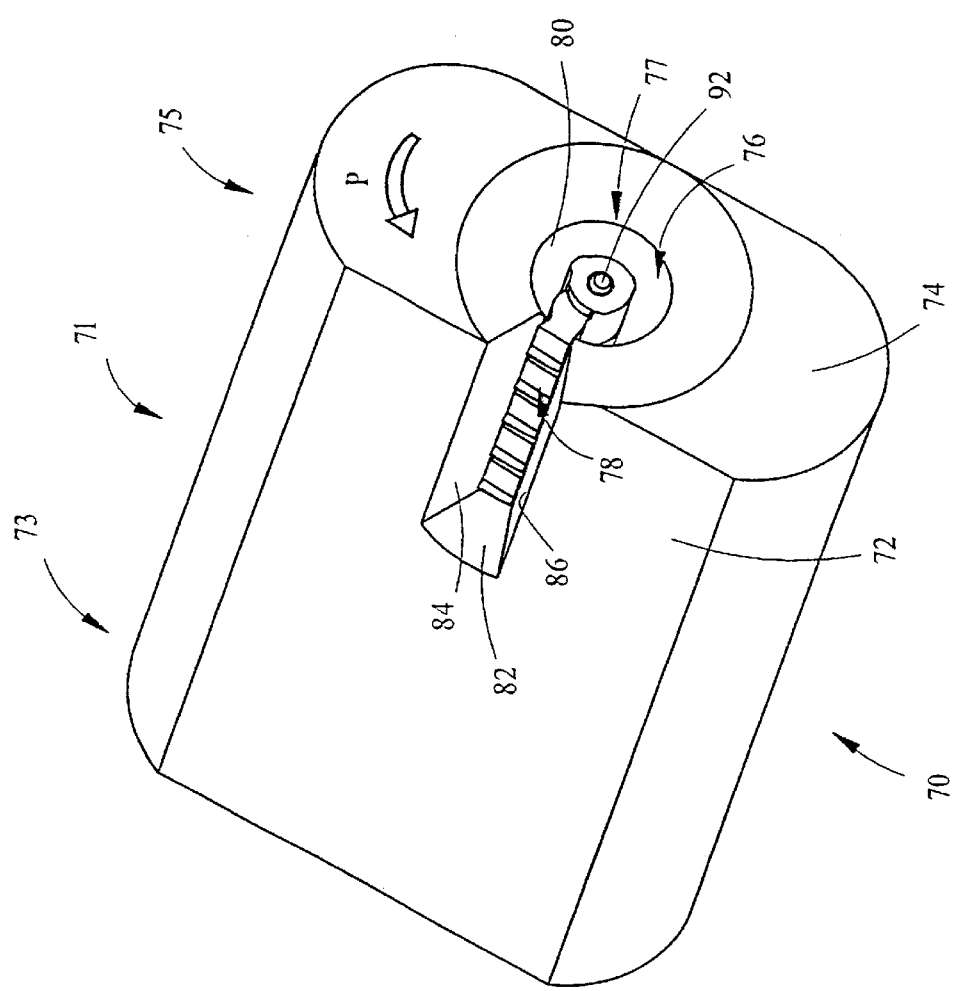
FIG. 12 is a perspective view of a first embodiment of an insert mounting key according to the present invention for mounting a cutting insert in a cutting insert holder and capable of holding therein a plurality of cutting inserts.

FIG. 12 shows an insert mounting key 70 for mounting cutting inserts having a through bore 66 on a cutting insert holder. The insert key 70 has a peripheral surface 71 and a cavity 76. The peripheral surface 71 extends from a rear portion 73 of the insert key to a front portion 75 thereof and comprises a side surface 72 and a front surface 74. The cavity 76 has a generally cylindrical inner side wall 80, a back wall 82 and opens to the front surface 74 into a substantially circular chamfered aperture 77. The cavity 76 further opens to the side surface 72 into a substantially rectangular aperture 78 extending axially along the cavity 76 from the front face 74 where the circular aperture 77 and the rectangular aperture 78 join. The aperture 78 has an upper lip 84 and a lower lip 86. The insert key is further provided with an elongated pin 92 concentric with the inner side wall 80 and extending from the rear portion 73 of the insert key towards the front surface 74. The function of the aperture 78 is to form a region of access and a tangential locating surface for the radial projections 46 of the cutting inserts. It should be noted that the same function can be achieved by an internal axially extending recess in the inner side wall 80. However, in preferred embodiments, the aperture 78 is used since it is easier to manufacture and enables easy access to all the cutting inserts retained in the insert key.

The assembling of a cutting tool assembly using the insert key 70 will now be described. Cutting inserts 14 are first loaded in the insert key so that for each cutting insert the insert's radial projection 46 is located within the aperture 78 and the tangential abutment surface 62 abuts the lower lip 86. The insert key 70 is then aligned with the cutting insert holder 12 so that the pin 92 is approximately aligned with the axis A of the insert retaining portion 18 and the rib 54 of the cutting insert is opposite the groove 40 of the clamping jaw 24. The insert key 70 is then pushed axially towards the cutting insert holder 12 till the axial abutment surface 64 of the leading cutting insert abuts the axial abutment surface 38 of the cutting insert holder 12. The insert key 70 is then rotated with respect to the cutting insert holder 12 in the direction of the arrow P as shown in FIG. 12 till the upper lip 84 of the insert key 70 comes in contact with the rake surface 58 of the cutting insert 14 thus rotating the cutting insert 14 with respect to the cutting insert holder 12 and urging the rib 54 of the cutting insert 14 under the clamping surface 42 of the cutting insert holder 12 till the tangential abutment surface 62 abuts the tangential abutment surface 36. In this position, the cutting insert 14 is clamped within the insert retaining portion 18 by a radially inwardly directed force exerted by the displaced clamping jaw 24 on the cutting insert. The insert key 70 is then axially withdrawn from the cutting tool assembly 10.

Figure 13:
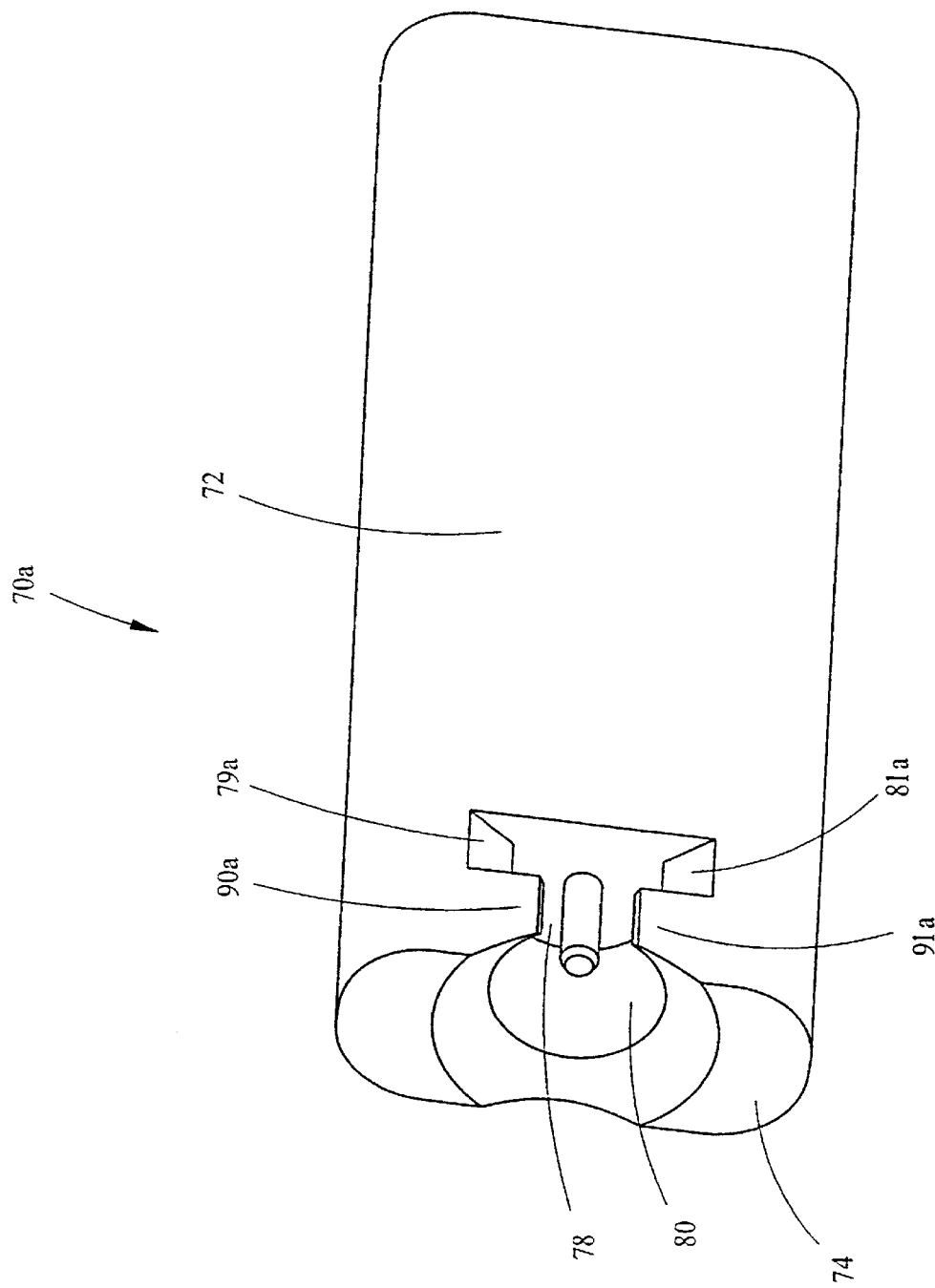
FIG. 13 is a perspective view of an insert removing key according to the present invention for removing a cutting insert from a cutting insert holder.

Attention is now drawn to FIG. 13 showing an insert removing key 70a for removing a cutting insert from the insert retaining portion of the cutting insert holder. The insert key shown in the figure is capable of holding only one removed insert. However, it will be appreciated that it can be designed to hold any number of removed inserts. The insert removing key 70a is similar in construction to the insert mounting key 70 except that the insert removing key is provided with a first transverse aperture 79a located rearward of the front surface 74. The first transverse aperture 79a opens from the inner side wall 80 into the side surface 72 and extends on the side surface transversely from the rectangular aperture 78. The insert key 70a is further provided with a second transverse aperture 81a opposite the first transverse aperture 79a with respect to the rectangular aperture 78. By this construction two teeth 90a and 91a are formed adjacent the two respective apertures 79a and 81a. The insert key 70a is provided with two transverse apertures so that it can be used to disassemble both right and left hand cutting inserts.

As stated above, the removing of the cutting insert 14 from the cutting insert holder 12 is carried out in a reverse order to that of the mounting of the cutting insert. The function of the teeth 90a and 91a is to hold the cutting insert within the cavity 76 of the insert key 70a whilst axially withdrawing it from the cutting insert holder 12 during the removing of a cutting insert 14. For a right handed tool the tooth 90a is used whereas for left handed tool the tooth 91a is used.

Figure 14:
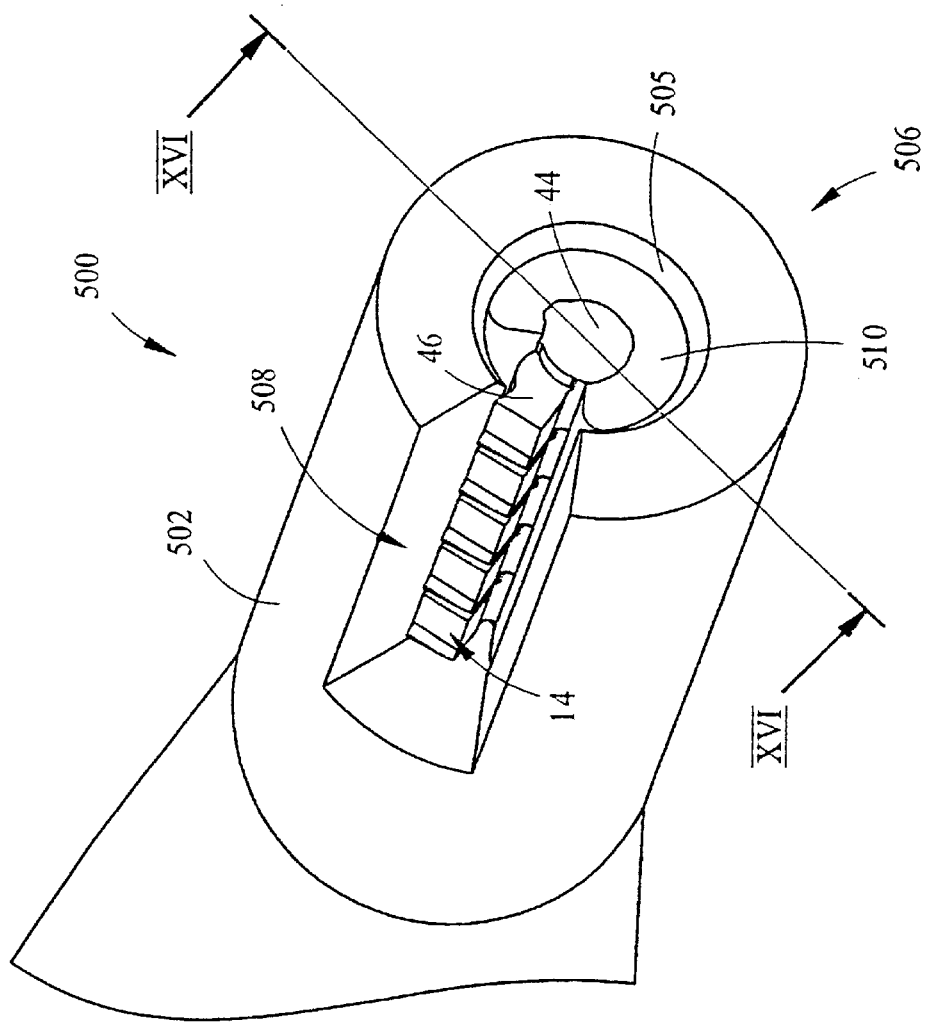
FIG. 14 is a partial perspective view of a second embodiment of an insert mounting key according to the present invention for cutting inserts having no axial bore.
Figure 15:
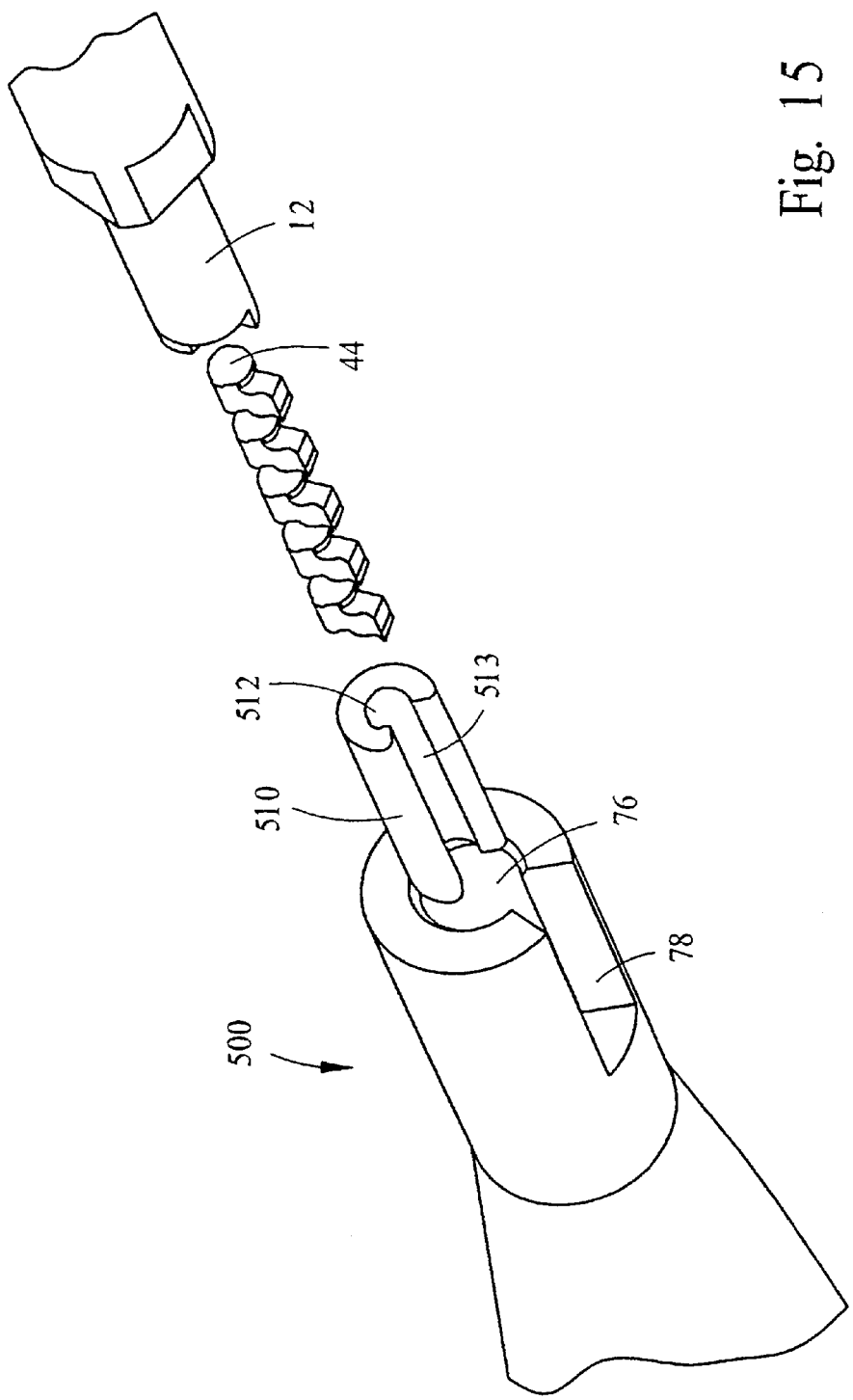
FIG. 15 is a perspective exploded view of the insert key of FIG. 14.
Figure 16:
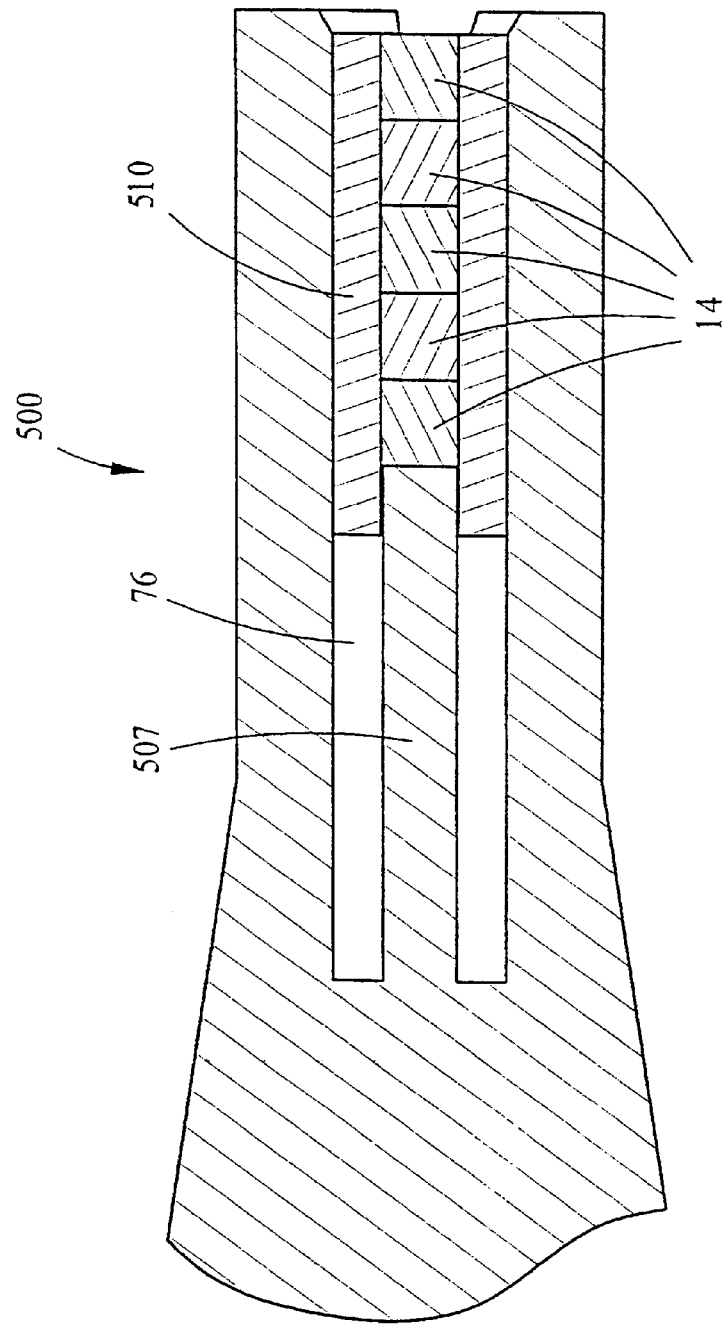
FIG. 16 is a longitudinal cross-sectional view of the insert key of FIG. 14.
Figure 17:
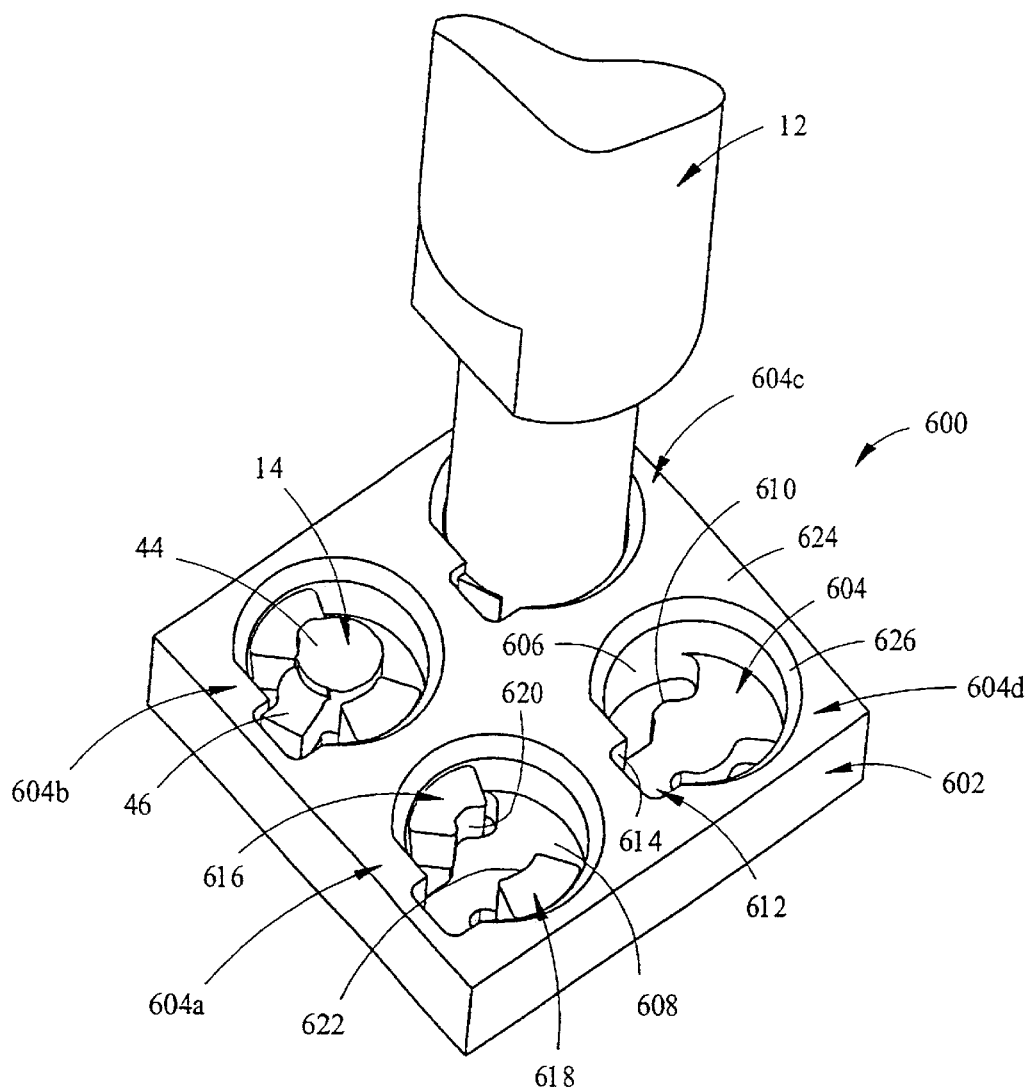
FIG. 17 is a perspective view of a third embodiment of an insert mounting key according to the present invention capable of receiving therein a plurality of cutting inserts retained in the same plane showing different stages of assembling a cutting insert in a cutting insert holder.
Figure 18:
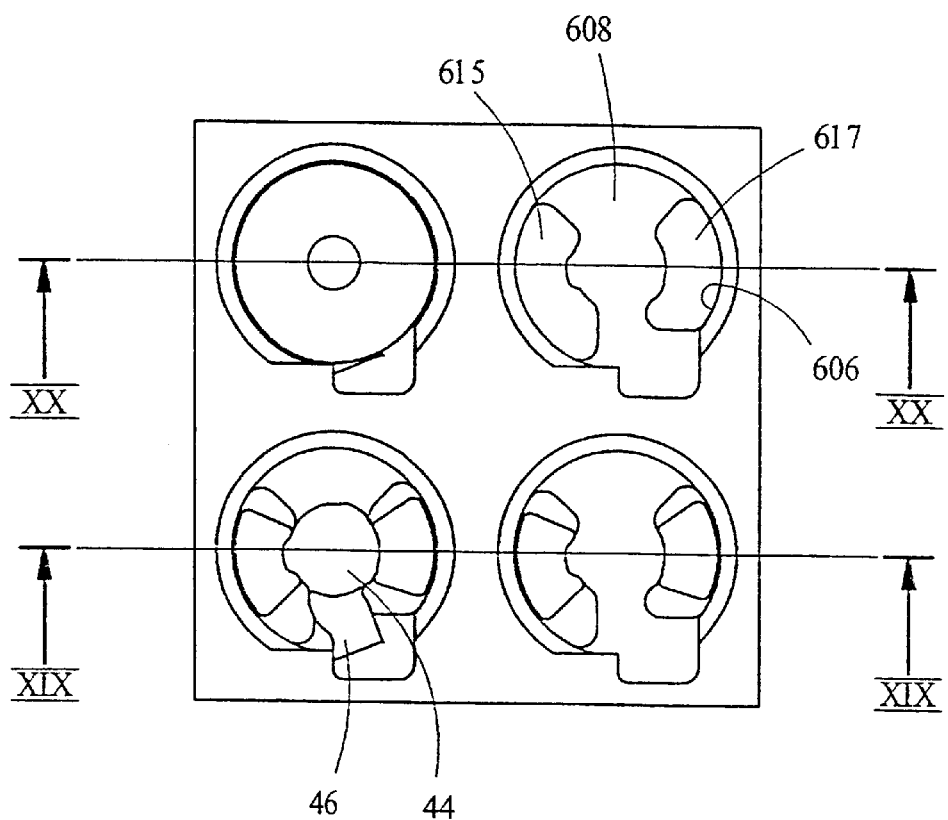
FIG. 18 is a top view of the insert key of FIG. 17.
Figure 19:
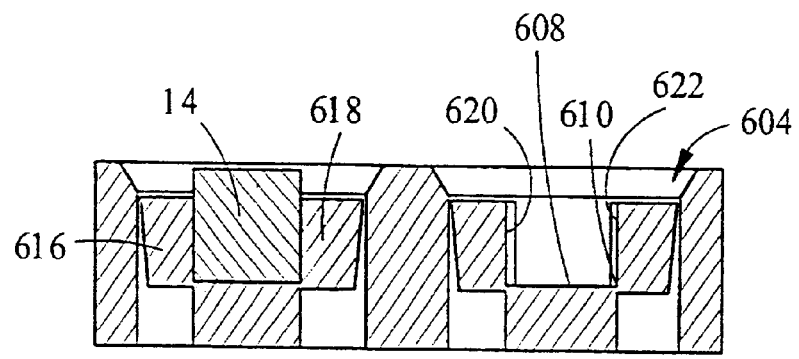
FIG. 19 is a sectional view taken along line XIX—XIX in FIG. 18.
Figure 20:
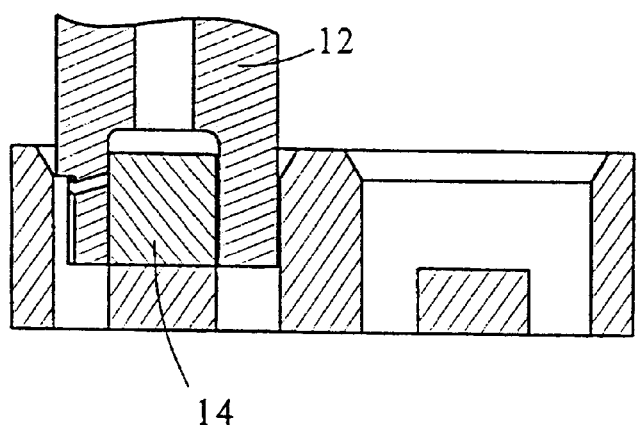
FIG. 20 is a sectional view taken along line XX—XX in FIG. 18.

Attention is now drawn to FIGS. 14 to 16, showing an insert mounting key 500 capable of holding a plurality of cutting inserts without axial through bores. The insert key 500 is similar to the insert key 70 except for certain features relating to the fact that the cutting inserts do not have through bores. The insert key 500 has a centrally located pin 507 extending from the bottom of the cavity 76. The cross-sectional dimension of the pin 507 generally corresponds to the cross-sectional dimension of the generally cylindrical portion 44 of a cutting insert 14. An open ended sleeve 510 made from resilient material, e.g. plastic, is slidably insertable into the cavity 76. The sleeve 510 has a generally cylindrical cavity 512 and a substantially rectangular aperture 513, both of which extend axially along the whole length of the sleeve. When the sleeve 510 is located in the cavity 76 the rectangular aperture 513 coincides with the rectangular aperture 78 in the side surface 72 of the insert key.

A plurality of cutting inserts 14, which in this embodiment is five, is inserted into the cavity 512 and self retained therein. The length of the sleeve 510 is chosen so that it can hold the required number of cutting inserts 14. The length of the cavity 76 is generally twice the length of the sleeve 510 so that the sleeve can be backwardly slided each time a new cutting insert is mounted on the cutting insert holder.

The sleeve 510 with the plurality of cutting inserts 14 retained therein is inserted into the cavity 76 in a slidable manner with the cutting inserts' radial projection 46 directed into the aperture 78. The procedure for using the insert key 500 for mounting a cutting insert 14 in the insert retaining portion 18 of the cutting insert holder 12 is similar to that described above in relation to the use of the insert key 70. The main difference between the two keys is that when the cutting insert holder 12 is axially inserted into the cavity 76 of the insert key 500 it axially displaces the sleeve 510 rearwards a length equal to the length of a cutting insert in a rearward direction of the insert key 500. The remaining cutting inserts are not displaced relative to the insert key 500 due to the pin 507 which prevents their rearward movement whilst serving as a guide for the sleeve 510.

Another embodiment of an insert mounting key 600, which can mount therein a plurality of cutting inserts retained in the same plane, is shown in FIGS. 17 to 20. The insert key 600 has a base plate 602 with one cutting insert 14 retained in each generally cylindrical insert retaining pocket 604. The base plate 602 is made of a rigid, brittle and relatively soft material such as plastic or the like.

Each insert retaining pocket 604 has a peripheral surface 606 and an axial abutment surface 608 having a rim 610. The peripheral surface 606 has a radially outwardly extending groove 612 having a stopper 614 that is substantially tangentially directed. Shearingly connected to the rim 610 along a part thereof and extending upwardly therefrom are two retaining members 616 and 618 having, respectively, lateral abutment surfaces 620 and 622. The shape and size of the respective axial and lateral abutment surfaces 608, 620 and 622 are designed according to the corresponding surfaces of a cutting insert to be retained in the insert retaining pocket 604. Between the axial abutment surface 608 and the peripheral surface 606 are two apertures 615, 617. The size and shape of each aperture being designed to allow the free passage of the retaining members therethrough in an axial direction. Each insert retaining pocket 604 merges with the top surface 624 of the base plate 602 via a chamfered portion 626 which is designed to enable easy insertion of the cutting insert holder 12 into the insert retaining pocket 604.

The insert key 600 can have any number of insert retaining pockets 604. In the figures, four insert retaining pockets are shown, 604a, 604b, 604c and 604d, each of which will be used below to describe a different stage of the assembling process. Insert retaining pocket 604a shows an insert retaining pocket prior to its retaining of a cutting insert 14. Insert retaining pocket 604b shows an insert 14 retained in the insert retaining pocket and axially abutting the axial abutment surface 608. The cutting insert's generally cylindrical portion 44 is retained between the retaining members 616 and 618, with the cutting insert's radial projection 46 located freely within the groove 612. The cutting insert holder 12 is axially inserted into the insert retaining pocket 604c till the cutting insert's axial abutment surface 64 abuts the axial abutment surface 38 of the cutting insert holder 12. During the axial downward displacement of the cutting insert holder 12 it pushes the retaining members 616 and 618 and shears them off. Then, the cutting insert holder 12 is rotated clockwise to bring the cutting insert into final assembled position within the cutting insert holder whilst rotation of the cutting insert is prevented by means of the stopper 614.

Insert retaining pocket 604d shows an insert retaining pocket after the retaining members 616 and 618 have been sheared off.

FIG. 21 shows a perspective view of an internal cutting tool 700 in accordance with the present invention. The cutting tool 700 is provided with an aperture 702 in the front portion of the cutting insert holder 704 to enable the passage of cooling fluid through the cutting insert holder. If necessary, cooling fluid could also be applied through the through bore 706 in the cutting insert 708.

Although the present invention has been described to a certain degree of particularity, it should be understood that various alterations and modifications could be made without departing from the spirit or scope of the invention as hereinafter claimed.

What is claimed is:

1. A cutting tool assembly (10) comprising a cutting insert holder (12) and a cutting insert (14), the cutting insert holder comprising a body portion (16) and an insert retaining portion (18) the insert retaining portion having a generally cylindrical inner surface (32) of first diameter (D1) and a longitudinal axis A;

the insert retaining portion (18) comprising a fixed portion (22) connected to the body portion (16) and an axially extending clamping jaw (24) having a radially facing clamping surface (42), the axially extending clamping jaw (24) being connected to the fixed portion (22) on one side along an axially extending juncture (25) and separated from the fixed portion (22) on an other side along an axially extending free end (30) by an axially extending aperture (27), the axially extending aperture (27) being bound by the free end (30) of the clamping jaw (24) on one side and by an axially extending first locating surface (36) of the fixed portion (22), adjacent the inner surface (32), on an opposite side;

the cutting insert (14) comprising a generally cylindrical portion (44) having a longitudinal axis B and an axially extending radial projection (46) connected thereto, the radial projection having upper and lower surfaces (55, 62) connected to the cylindrical portion (44) and being separated by a side surface (57), the upper surface (55) and the side surface (57) meeting at an edge, at least a portion of which constitutes a cutting edge (56), and the lower surface (62) constitutes a first locating surface;

the cutting insert (14) being located in the insert retaining portion (18) with the axially extending radial projection (46) protruding from the axially extending aperture (27) and the first locating surface (62) of the cutting insert abutting the first locating surface (36) of the insert retaining portion (18);

the clamping jaw (24) being separated from the body portion (16) by a slot (26), and being resiliently displaceable relative to the fixed portion (22); and the cutting insert (14) being clamped in position by means of a resilient radial force exerted by the clamping surface (42) of the clamping jaw (24) on the generally cylindrical portion (44) of the cutting insert (14).

2. The cutting tool assembly according to claim 1, wherein the cutting insert (14) is provided with an axially extending centrally located through bore (66) and the cutting insert holder (12) is provided with an associated centrally located bore (43) opening out into a back wall (45) of the insert retaining portion (18).

3. The cutting tool assembly according to claim 1, wherein the cylindrical portion (44) is of an axial extent greater than the axial extent of the radial projection (46).

4. The cutting tool assembly according to claim 1, wherein the generally cylindrical portion (44) of the cutting insert (14) is provided with three axially extending ribs (50, 52, 54).

5. The cutting tool assembly according to claim 4, wherein two of the three axially extending ribs (50, 52) have radially outermost regions that lie on a cylindrical envelope of a second diameter (D2) having as axis the longitudinal axis B.

6. The cutting tool assembly according to claim 5, wherein the second diameter (D2) is equal to the first diameter (D1).

7. The cutting tool assembly according to claim 4, wherein one of the three axially extending ribs (54) has a radially outermost region that lies on a cylindrical envelope of a third diameter (D3).

8. The cutting tool assembly according to claim 7, wherein the third diameter (D3) is greater than the first diameter (D1).

9. The cutting tool assembly according to claim 7, wherein two of the three axially extending ribs (50, 52) have radially outermost regions that lie on a cylindrical envelope of a second diameter (D2) and wherein the third diameter (D3) is greater than the second diameter (D2).

10. The cutting tool assembly according to claim 4, wherein the three axially extending ribs (50, 52, 54) are angularly disposed by 120° one from another, with respect to the axis B.

11. The cutting tool assembly according to claim 1, wherein the cutting insert is clamped in position with the clamping surface (42) of the clamping jaw (24) abutting the axially extending rib (54) of the generally cylindrical portion (44).

12. The cutting tool assembly according to claim 1, wherein the clamping jaw (24) is wider at the juncture (25) than at the free end (30) and tapers from the juncture to the free end.

13. The cutting tool assembly according to claim 1, wherein the clamping jaw (24) is thicker at the juncture (25) than at the free end (30).

14. The cutting tool assembly according to claim 1, wherein the axially extending first locating surface (62) of the cutting insert (14) and the axially extending first locating surface (36) of the fixed portion (22) of the insert retaining portion (18) are planar.

15. The cutting tool assembly according to claim 1, wherein the insert retaining portion (18) of the cutting insert holder (12) is further provided with a generally axially directed second locating surface (38) adjacent the first locating surface (36) and transverse thereto, the cutting insert (14) is provided with a second locating surface (64) adjacent the first locating surface (62) and transverse thereto, and wherein the second locating surface (64) of the cutting insert (14) abuts the second locating surface (38) of the cutting insert holder (12).

16. The cutting tool assembly according to claim 1, wherein the axially extending first locating surface of the cutting insert is in the form of a generally V-shaped protrusion (143) and the axially extending first locating surface of the fixed portion of the insert retaining portion is in the form of a complementary shaped V-shaped groove (135).

17. The cutting tool assembly according to claim 1, wherein the axially extending first locating surface (343) of the cutting insert is convex and the axially extending first locating surface of the fixed portion of the insert retaining portion is a complementary shaped concave surface (335).

18. The cutting tool assembly according to claim 1, wherein the axially extending first locating surface (243) of the cutting insert is concave and the axially extending first locating surface of the fixed portion of the insert retaining portion is a complementary shaped convex surface (235).

19. The cutting tool assembly according to claim 1, wherein the clamping jaw (24) is further provided with an axially extending groove (40) merging with the clamping surface (42) of the claming jaw.

20. The cutting tool assembly according to claim 1, wherein the cutting insert is generally symmetrical about a symmetry plane (M) and has two sets of cutting edges (456', 456") on both sides of the symmetry plane.

21. An insert key (70, 500) for use with the cutting tool assembly according to claim 1, for mounting the cutting insert (14) on the cutting insert holder (12), the insert key comprising:
a peripheral surface (71) extending from a rear portion (73) of the insert key to a front portion (75) thereof and comprising a side surface (72) and a front surface (74);
a cavity (76) having a generally cylindrical inner side wall (80), the cavity opening to the front surface (74) into a substantially circular aperture (77) and opening into the side surface (72) into a substantially rectangular aperture (78) extending axially along the cavity (76) from the front surface (74) where the circular and rectangular apertures join.

22. The insert key (70) according to claim 21, further provided with an elongated pin (92) concentric with the cylindrical inner side wall (80) and extending from the rear portion (73) of the insert key towards the front surface (74).

23. The insert key (500) according to either of claims 21 or 22, further provided with an open ended sleeve (510) made from resilient material and slidably insertable into the cavity (76), the sleeve (510) having a generally cylindrical cavity (512) and a substantially rectangular aperture (513) extending along the sleeve and coinciding with the rectangular aperture (78) in the side surface of the insert key when the sleeve is located in the cavity (76).

24. An insert key (70a) for use with the cutting tool assembly according to claim 1, for removing the cutting insert (14) from the cutting insert holder (12), the insert key comprising:
a peripheral surface (71) extending from a rear portion (73) of the insert key to a front portion (75) thereof and comprising a side surface (72) and a front surface (74);
a cavity (76) having a generally cylindrical inner side wall (80), the cavity opening to the front surface (74) into a substantially circular aperture (77) and opening into the side surface (72) into a substantially rectangular aperture (78) extending axially along the cavity (76) from the front surface (74) where the circular and rectangular apertures join; and
a first transverse aperture (79a) located rearward of the front surface, the transverse aperture opening from the inner side wall into the side surface and extending on the side surface transversely from the substantially rectangular aperture.

25. The insert key (70a) according to claim 24, further provided with a second transverse aperture (81a) opposite the first transverse aperture with respect to the rectangular aperture (78).

26. The insert key (70) according to either of claims 24 or 25, further provided with an elongated pin (92) concentric with the cylindrical inner side wall (80) and extending from the rear portion (73) of the insert key towards the front surface (74).

27. An insert key (600) for use with the cutting tool assembly according to claim 1, for mounting the cutting insert (14) on the cutting insert holder (12), the insert key (600) comprising:
a base plate (602) having a plurality of insert retaining pockets (604), each insert retaining pocket comprising a peripheral surface (606) and an axial abutment surface (608) connected thereto, two retaining members (616, 618) shearingly connected to the base plate (602) detachingly retaining the generally cylindrical portion (44) of the cutting insert (14) and a cutting insert rotation prevention stopper (614) connected to the base plate (602).

28. The insert key (600) according to claim 27, wherein the cutting insert rotation prevention stopper (614) is a tangentially directed portion of a radially outwardly extending groove (612) in the base plate (602).

29. The insert key (600) according to claim 27, wherein the insert retaining pocket (604) is provided with two apertures (615, 617) located between the axial abutment surface (608) and the peripheral surface (606), a retaining member (616, 618) is located above each aperture (615, 617), the size and shape of each aperture being such as to allow the free passage of the retaining members therethrough in an axial direction.

30. The insert key (600) according to claim 29, wherein the retaining members (616, 618) are shearingly connected to the axial abutment surface (608) by a rim (610).

31. The cutting tool assembly according to claim 1, wherein the slot (26) having a periphery (29) and an inner portion (31) and wherein the slot being slanted rearwardly from its periphery towards its inner portion.

32. A cutting insert (14) comprising a generally cylindrical portion (44) having a longitudinal axis B and an axially extending radial projection (46) connected thereto, the radial projection having upper and lower surfaces (55, 62) connected to the cylindrical portion and being separated by a side surface (57), the upper surface (55) and the side surface (57) meeting at an edge, at least a portion of which constitutes a cutting edge (56) and the lower surface (62) constituting a first locating surface, wherein:
the generally cylindrical portion is provided with three axially extending ribs,
two of the three axially extending ribs (50, 52) have radially outermost regions that lie on a cylindrical envelope of a second diameter (D2) having as axis the longitudinal axis B, and
one of the three axially extending ribs (54) has a radially outermost region that lies on a cylindrical envelope of a third diameter (D3) that is greater than the second diameter (D2).

33. The cutting insert according to claim 32, wherein the cutting insert is provided with an axially extending centrally located through bore (66).

34. A cutting insert (14) comprising a generally cylindrical portion (44) having a longitudinal axis B and an axially extending radial projection (46) connected thereto, the radial projection having upper and lower surfaces (55, 62) connected to the cylindrical portion and being separated by a side surface (57), the upper surface (55) and the side surface (57) meeting at an edge, at least a portion of which constitutes a cutting edge (56) and the lower surface (62) constituting a first locating surface, wherein:
the generally cylindrical portion is provided with three axially extending ribs,
two of the three axially extending ribs (50, 52) have radially outermost regions that lie on a cylindrical envelope of a second diameter (D2) having as axis the longitudinal axis B, and one of the three axially extending ribs (54) has a radially outermost region that lies on a cylindrical envelope of a third diameter (D3) that is greater than the second diameter (D2), and the three axially extending ribs (50, 52, 54) are angularly disposed by 120° one from another, with respect to the axis B.

35. The cutting insert according to claim 32, wherein the first locating surface (62) is planar.

36. The cutting insert according to claim 32, wherein the radial projection (46) is provided with a second locating surface (64) adjacent the first locating surface (62) and transverse thereto.

37. The cutting insert according to claim 32, wherein the axially extending first locating surface of the cutting insert is in the form of a generally V-shaped protrusion (143).

38. The cutting insert according to claim 32, wherein the axially extending first locating surface (343) of the cutting insert is convex.

39. The cutting insert according to claim 32, wherein the axially extending first locating surface (243) of the cutting insert is concave.

40. A cutting tool assembly (10) comprising a cutting insert holder (12) and a cutting insert (14), the cutting insert holder comprising a body portion (16) and an insert retaining portion (18) the insert retaining portion having a generally cylindrical inner surface (32) of a first diameter (D1) and a longitudinal axis A;

the insert retaining portion (18) comprising a fixed portion (22) connected to the body portion (16) and an axially extending clamping jaw (24) having a radially facing clamping surface (42), the axially extending clamping jaw (24) being connected to the fixed portion (22) on one side along an axially extending juncture (25) and separated from the fixed portion (22) on an other side along an axially extending free end (30) by an axially extending aperture (27), the axially extending aperture (27) being bound by the free end (30) of the clamping jaw (24) on one side and by an axially extending first locating surface (36) of the fixed portion (22), adjacent the inner surface (32), on an opposite side;

the cutting insert (14) comprising a generally cylindrical portion (44) having a longitudinal axis B and an axially extending radial projection (46) connected thereto, the radial projection having upper and lower surfaces (55, 62) connected to the cylindrical portion (44) and being separated by a side surface (57), the upper surface (55) and the side surface (57) meeting at an edge, at least a portion of which constitutes a cutting edge (56), and the lower surface (62) constituting a first locating surface;

the cutting insert (14) being located in the insert retaining portion (18) with the axially extending radial projection (46) protruding from the axially extending aperture (27) and the first locating surface (62) of the cutting insert abutting the first locating surface (36) of the insert retaining portion (18);

the clamping jaw (24) being separated from the body portion (16) by a slot (26), and being resiliently displaceable relative to the fixed portion (22);

the cutting insert (14) being clamped in position by means of a resilient radial force exerted by the clamping surface (42) of the clamping jaw (24) on the generally cylindrical portion (44) of the cutting insert (14);

wherein in a first clamping position the clamping surface (42) of the clamping jaw (24) lies on a cylindrical envelope having a second diameter (D2), and wherein in a second clamping position the clamping surface (42) of the clamping jaw (24) lies on a cylindrical envelope having a third diameter (D3) that is larger than the second diameter (D2).

41. A cutting insert comprising a generally cylindrical portion having a longitudinal axis B and an axially extending radial projection connected thereto, the axially extending radial projection having upper and lower surfaces connected to the cylindrical portion and at least one cutting edge associated with the upper surface, wherein:

the generally cylindrical portion is provided with three axially extending ribs that are circumferentially spaced apart from one another along the generally cylindrical portion;

first and second axially extending ribs have radially outermost regions that lie on a cylindrical envelope of a second diameter (D2) having as axis the longitudinal axis B; and a third axially extending rib has a radially outermost region that lies on a cylindrical envelope of a third diameter (D3) that is greater than the second diameter (D2), said third axially extending rib being spaced apart from said axially extending radial projection.

42. The cutting insert according to claim 41, wherein the three axially extending ribs are angularly disposed by 120° one from another, with respect to the axis B.

43. A cutting insert comprising a generally cylindrical portion having a longitudinal axis B and a single axially extending radial projection connected thereto, the axially extending radial projection having upper and lower surfaces connected to the cylindrical portion and at least one cutting edge associated with the upper surface, wherein:

the generally cylindrical portion is provided with three axially extending ribs that are circumferentially spaced apart from one another along the generally cylindrical portion;

first and second axially extending ribs have radially outermost regions that lie on a cylindrical envelope of a second diameter (D2) having as axis the longitudinal axis B; and a third axially extending rib has a radially outermost region that lies on a cylindrical envelope of a third diameter (D3) that is greater than the second diameter (D2).

44. The cutting insert according to claim 43, wherein the three axially extending ribs are angularly disposed by 120° one from another, with respect to the axis B.

45. The cutting insert according to claim 43, wherein said third axially extending rib is spaced apart from said single axially extending radial projection.

* * * * *